US009336327B2

(12) United States Patent
Melnik et al.

(10) Patent No.: US 9,336,327 B2
(45) Date of Patent: May 10, 2016

(54) MAPPING AND QUERY TRANSLATION BETWEEN XML, OBJECTS, AND RELATIONS

(75) Inventors: Sergey Melnik, Kirkland, WA (US); Philip A. Bernstein, Bellevue, WA (US); James F. Terwilliger, Portland, OR (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 668 days.

(21) Appl. No.: 12/147,822

(22) Filed: Jun. 27, 2008

(65) Prior Publication Data

US 2009/0150367 A1     Jun. 11, 2009

Related U.S. Application Data

(60) Provisional application No. 60/991,219, filed on Nov. 30, 2007.

(51) Int. Cl.
*G06F 7/00* (2006.01)
*G06F 17/30* (2006.01)

(52) U.S. Cl.
CPC .... *G06F 17/30917* (2013.01); *G06F 17/30914* (2013.01)

(58) Field of Classification Search
CPC ................................................ G06F 17/30914
USPC ......................................................... 707/760
See application file for complete search history.

(56) References Cited

U.S. PATENT DOCUMENTS

| 7,647,298 | B2 | 1/2010 | Adya et al. |
| 7,680,767 | B2 | 3/2010 | Adya et al. |
| 2002/0143742 | A1* | 10/2002 | Nonomura et al. ............... 707/1 |
| 2003/0149934 | A1* | 8/2003 | Worden ......................... 715/513 |
| 2004/0193575 | A1* | 9/2004 | Chen et al. ........................ 707/3 |
| 2007/0226196 | A1* | 9/2007 | Adya et al. ........................ 707/3 |
| 2008/0172603 | A1* | 7/2008 | Agarwal et al. ............... 715/239 |

FOREIGN PATENT DOCUMENTS

WO     WO 2004107162 A1 * 12/2004

OTHER PUBLICATIONS

Terwilliger, James F. et al., "Language-Integrated Querying of XML Data in SQL Server", ACM Sigmoid '08, Vancouver, BC, Canada, 3 pgs.

(Continued)

*Primary Examiner* — Ajith Jacob
(74) *Attorney, Agent, or Firm* — Alin Corie; Sandy Swain; Micky Minhas

(57) ABSTRACT

Described is programmatic access to persistent XML and relational data from applications based upon explicit mappings between object classes, XML schema types, and relations. The mappings are used in data access, that is, they drive query and update processing. A query may be processed into a query for accessing the XML data and another query for second type for accessing the relational data. Mappings support strongly-typed classes and loosely-typed classes, and may be conditional upon other data, may decouple query and update translation performed at runtime from schema translation used at compile time, and/or may be compiled into transformations that produce objects from XML data and transformations that produce XML data from objects. Mappings may be generated automatically or provided by the developer.

20 Claims, 24 Drawing Sheets

(56) References Cited

OTHER PUBLICATIONS

Terwilliger, James et al., "XML Shredding Storage in the Entity Framework: Using an Additional level of mappings to allow stored XML to be exposed as objects through ADO.net", Microsoft, Aug. 9, 2007, 35 pgs.

Melnik, Sergey et al., "XML Mapping: Mapping between XML Schema, objects, and relations, and translating LINQ queries into SQL/XQuery", Nov. 16, 2007, 47 pgs.

Lammel, Ralf et al., "Revealing the X/O Impedance Mismatch (Changing Lead into Gold)", Datatype-Generic Programming, LNCS, Springer-Verlag, Jun. 2007, available at: http://homepages.cwi.nl~ralf/xo-impedance-mismatch/paper.pdf, 80 pgs.

Lammel, Ralf, "Announcing the LINQ to XSD Preview", Microsoft XML Team Blog, Nov. 27, 2006, available at: http://blogs.msdn.com/xmlteam/archive/2006/11/27/typed-xml-programmer-welcome-to-linq.aspx, 4 pgs.

* cited by examiner

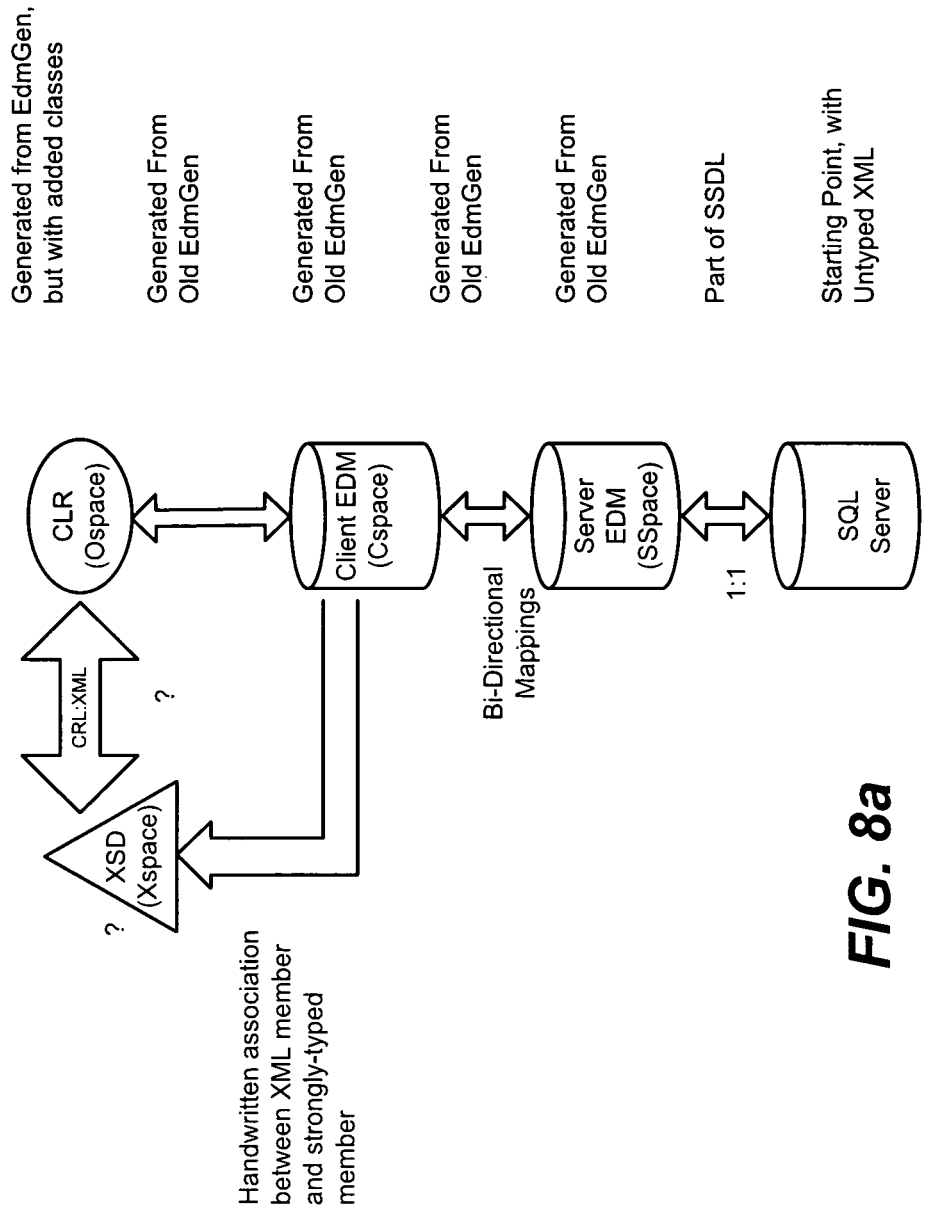

FIG. 13 x IS OF
EDMfoo

```
EDMfoo(
    t  = "foo"
    a1 = {"first1", "first2"}
    a2 = {"second"}
    b  = 5
    c12 = {1, 2}
    c3 = NULL
    d  = EDMbar(
            g = "baz"
         )
    any = ⎡<any1/>⎤
          ⎢<any2/>⎥
          ⎣<any3/>⎦
)
```

$y instance of
element(*, XSDfoo)

```
<value t="foo">
  <a>first1</a>
  <a>first2</a>
  <b>5</b>
  <any1/>
  <any2/>
  <any3/>
  <c>1</c>
  <c>2</c>
  <d>
    <g>baz</g>
  </d>
  <a>second</a>
</value>
```

τmap(x, $y) holds

MAPPING AND QUERY TRANSLATION BETWEEN XML, OBJECTS, AND RELATIONS

CROSS-REFERENCE TO RELATED APPLICATION

The present application claims priority to U.S. provisional patent application Ser. No. 60/991,219, filed Nov. 30, 2007 and hereby incorporated by reference.

BACKGROUND

XML data has become ubiquitous in data-centric applications. Many commercial database management systems support XML storage, and thus developers need to programmatically access persistent XML data.

However, object-oriented access is often the preferred method for application programmers to access persistent storage. Notwithstanding, the problem of translating between XML and objects automatically is largely unsolved, generally due to differences in the expressive power of their type systems and the difficulty of translating object queries into an XML query language (such as XQuery). In hybrid relational/XML databases, this problem is compounded by the object-relational impedance mismatch, since XML data can be partitioned across multiple relational tables.

Several object-relational mapping (ORM) frameworks have emerged to help application developers bridge objects and relations. These frameworks leverage the performance and scalability of databases by translating queries on objects into equivalent queries in SQL. However, typically ORMs do not handle the mismatch between objects and XML.

SUMMARY

This Summary is provided to introduce a selection of representative concepts in a simplified form that are further described below in the Detailed Description. This Summary is not intended to identify key features or essential features of the claimed subject matter, nor is it intended to be used in any way that would limit the scope of the claimed subject matter.

Briefly, various aspects of the subject matter described herein are directed towards a technology by which mappings are provided between object classes and XML, and the mappings used allow programming against a database that contains sets relational data and XML data. Access to the data is represented as classes, independent of whether each set of data corresponds to relational data or XML data. For example, in one aspect, explicit declarative mappings that are expressed using a data manipulation language, and the mappings support strongly-typed classes and loosely-typed classes. A single query may access both relational and XML data.

In one aspect, mappings may be conditional mappings, in which a same XML type is mapped to one of a plurality of different classes depending on at least one condition that applies to XML data that instantiates that type. A class may be mapped to one of a plurality of different XML types depending on at least one condition that applies to data of the class.

The mappings may be selectable, e.g., a runtime set of mappings may be selected that is different from the set of mappings used at compile time. Further, declarative object-XML mappings may be compiled into transformations that produce objects from XML data and transformations that produce XML data from objects.

Other advantages may become apparent from the following detailed description when taken in conjunction with the drawings.

BRIEF DESCRIPTION OF THE DRAWINGS

The present invention is illustrated by way of example and not limited in the accompanying figures in which like reference numerals indicate similar elements and in which:

FIG. 8a is a representation of generating mappings and XML.

FIGS. 9-16 are representations showing various aspects of declarative mappings.

DETAILED DESCRIPTION

Various aspects of the technology described herein are generally directed towards programmatic access to persistent XML and relational data, such as from .NET applications, including by using explicit mappings between object classes, XML schema types, and relations. The mappings drive query and update processing. The mappings can be generated automatically or provided by the developer. For example, the developer can write object queries using the language-integrated query (LINQ) feature of .NET. LINQ queries resemble SQL, but are statically compiled and type-checked in the developer's object-oriented programming language, such as C#. One example implementation translates LINQ queries into a mixture of SQL and XQuery to execute in the database.

Using LINQ allows expressing complex database queries in a simple fashion, e.g., by leveraging the IntelliSense feature in Visual Studio; (note that writing the corresponding queries directly in SQL/XQuery is prohibitively difficult for many developers). Furthermore, explicit mappings introduce a level of data independence that isolates queries from a changing persistence model. That is, database refactoring can often be done without breaking the application, by adjusting the mapping.

One example implementation extends the ADO.NET Entity Framework and leverages its object-relational mapping capabilities. As described herein, this example implementation runs on Microsoft SQL Server 2005, but this is only an example.

Figure 1:
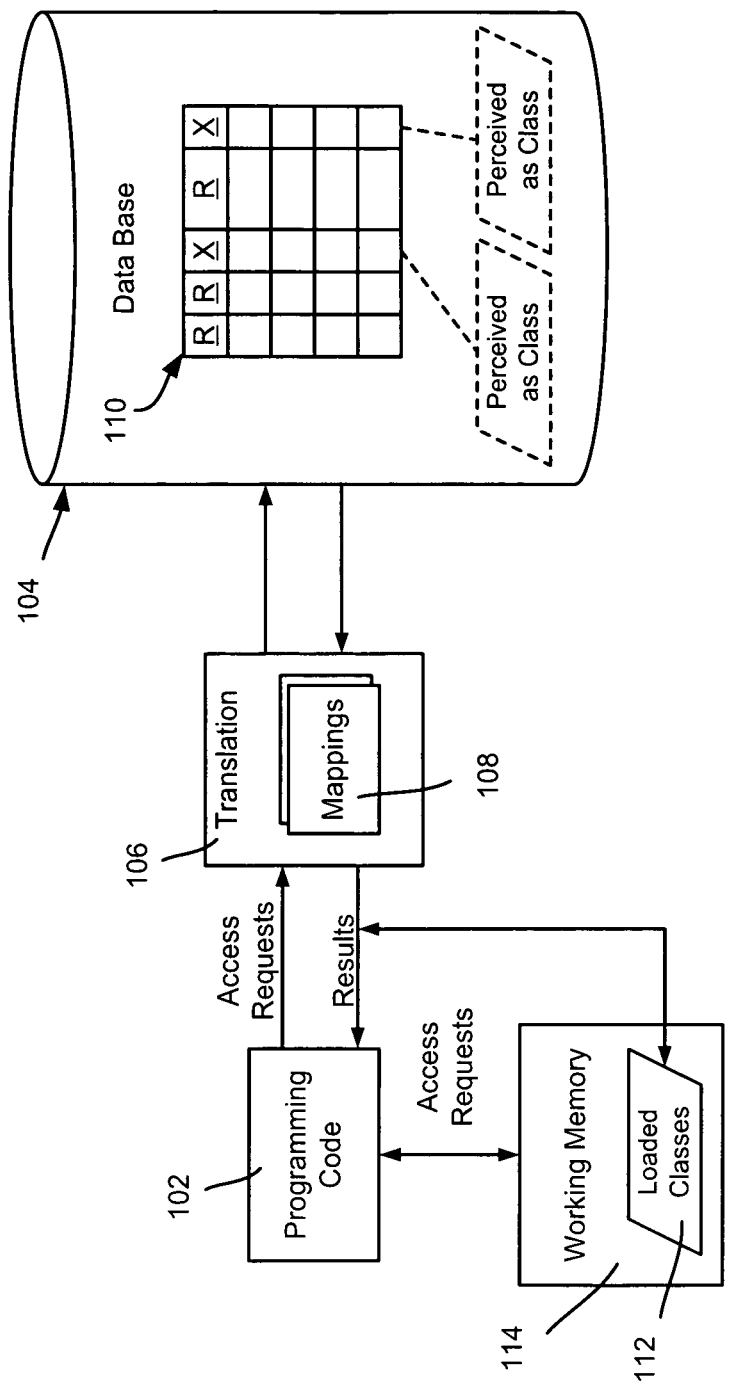
FIG. 1 is a block diagram representing example components in a computing environment in which database access is exemplified.

Turning to FIG. 1, in general, a programmer writes programming code 102 that is then used to access (e.g., query) a database 104. As described herein, a translation layer 106 or the like comprising mappings 108 allows the program to access a database table 110 that contains a mixture of relational data (columns labeled R) and XML data (columns labeled X) in a manner that insulates the programming code 102 from the underlying structure of the columns' different data types. To this end, the mappings 108 are used to expose the various data as object classes (as perceived by the programming code) regardless of whether the underlying data in the table 110 is maintained as relational data or XML data (according to some schema); the programming code 102 may then just program against those classes. Indeed, the programming code may specify that the classes are to be loaded as actual classes 112 into working memory 114. Note that as described below, more than one set of mappings may be provided for use.

One aspect is directed towards the use of explicit declarative mappings between object classes and XML that are expressed using a data manipulation language (e.g., XPath and XQuery). For example, an object type may be mapped to an XML schema complex type, in some defined, explicit way. As a result, a programmer can request classes to program against, and get classes that are configured in a predictable and desirable way (unlike deterministic tools that produce classes without any input as to how those classes will be arranged.) For example, the classes can be modified as desired, e.g., to adjust their names, types and so forth.

Another aspect is the supporting of strongly-typed classes (e.g., one class generated for each XML type) using object-XML mappings, as well as loosely-typed classes for generic XML manipulation (e.g., XElement in .NET). In this way, a programmer can choose how to use elements, e.g., with attributes (such as names of the elements, subelements and so forth) or not (e.g., via generic structures). Querying based on the attributes is thus made possible while retaining the ability to use generic structures.

Another aspect is directed towards combining object-relational and object-XML mappings to support querying of persistent relational and XML data, as well as a combination thereof. In this manner, for example, a programmer does not need to consider whether programming is against XML or relational data; the programmer accesses classes regardless of whether they are based on (mapped to) relational data or XML.

To this end, there is described translating LINQ queries into a mix of SQL and XQuery. This may include translating LINQ queries that simultaneously use both strongly-typed and loosely-typed objects representing XML data, and/or query rewriting, which may be driven by unfolding member and property accessors, e.g., by substituting XPath/XQuery expressions for each class member expression. In this manner, a programmer writes a query that looks like a SQL query but may contain embedded portions directed towards an XML query. This query is automatically and transparently processed into SQL for relational querying and XQuery for XML querying, with the results automatically and transparently recombined before returning.

Another aspect is directed towards conditional mappings, in which the same XML type may be mapped to several different classes depending on certain conditions that apply to the XML data that instantiates that type. For example, consider that XML data (e.g., representing a person) will be represented as either an instantiated customer class or an instantiated employee class based on another element in the XML; conditional mappings facilitate accessing the person type element (or the like) to determine which class to instantiate. Similarly, the same class may be conditionally mapped to different XML types based on one or more conditions in the class.

Another aspect is directed towards decoupling query and update translation performed at runtime from the schema translation algorithm used at compile time. For example, instead of fixing the translations between LINQ and XQuery, at runtime a different translation may be flexibly selected instead of the translation algorithm used at compile time; selection may be based on the query. This aspect supports schema evolution and advanced mapping scenarios that require data reshaping. The latter is desirable because it allows different highly-customized object schemas to be used, without needing to customize the query and update translation mechanisms.

Another aspect is directed towards compiling declarative object-XML mappings into structures (transformations) that produce objects from XML data (query views) and transformations that produce XML data from objects (update views). As a result, for example, instead of figuring out what a mapping does as a query is received at runtime, a transformation may be used that was developed beforehand, facilitating efficient execution.

Yet another aspect is directed towards translating XPath-like methods in the LINQ-to-XML API in .NET to the corresponding XPath expressions (corresponding to access methods) in a database query. For example, the LINQ-to-XML API has a number of methods attached to the generic (loosely-typed) XML API with access methods modeled according to XPath. As a result, a valid query may be written to manipulate objects and XML structures in memory, yet the same query remains valid if it is applied to the database instead of memory.

A further aspect is directed towards translating the combined database catalog (storing metadata about relational tables and XML schemas) into a set of object classes. As a result, database queries may be stated using LINQ over objects, which are usually much simpler than the native SQL/XQuery queries run directly on the database.

Figures 2A, 2B:
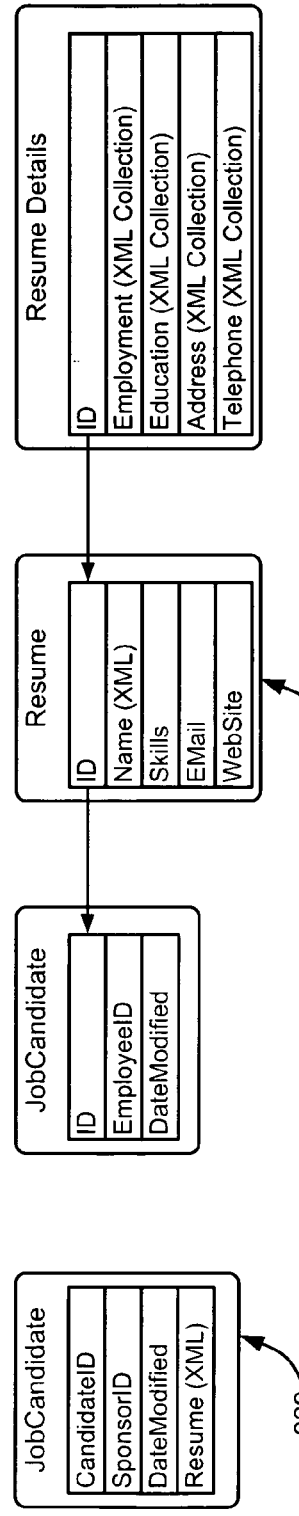
FIG. 2a is a representation of mapping XML data to a class to facilitate programmatic database access to that data.
FIG. 2b is a block diagram showing the data of FIG. 2a re-factored into multiple tables.

As generally represented in FIG. 2a, there is shown a part of mapping (the labeled arrows) between an XML schema type (block 202) and a class (block 204), which is a running example that is based on a sample database ("Adventure-Works") distributed with SQL Server 2005. This database contains several tables whose columns store XML data. For example, the table JobCandidate (block 222) shown in FIG. 2b has a column "Resume" whose contents are XML documents. FIG. 2a block 202 shows part of the XML schema for those documents.

With respect to querying XML as strongly-typed objects, it is shown herein how XML data that has an associated XML schema can be queried using classes mapped to XML schema types. The following C# program uses LINQ to list email addresses and schools attended by job candidates who have an email address and a Bachelor's degree:

```
using(AWdb db = new AWdb( )) {
    var q = from c in db.JobCandidates
        from e in c.Resume.Education
        where c.Resume.EMail != null && e.Degree.Contains("Bachelor")
```

```
    select new { c.Resume.EMail, e.School };
foreach (var i in q)
    Console.WriteLine(i);
}
```

The "var q" declaration indicates that the return type of the query is inferred by the compiler (as a collection of string pairs). Because the XML data is accessed as strongly-typed classes as described herein, this query can be written easily using the IntelliSense feature of Microsoft Visual Studio 2008, which automatically suggests member names such as Degree and School (they belong to the TEducation class whose definition is omitted for brevity, as are subelements of EducationType). The example implementation translates the query into the following SQL and XQuery:

```
WITH XMLNAMESPACES('http://.../Resume' AS r)
SELECT
    C.Resume.value('*[1]/r:EMail', 'varchar(max)'),
    E.value('./r:Edu.School', 'varchar(max)')
FROM HumanResources.JobCandidate C
CROSS APPLY C.Resume.nodes('*[1]/r:Education') T(E)
WHERE C.Resume.exist('*[1]/r:EMail')=1 AND
    E.exist('./r:Edu.Degree[contains(.,"Bachelor")]')=1
```

The functions "value", "nodes", and "exist" are SQL Server-specific directives that apply XQuery expressions to XML fragments. Although in this example the query may have been expressed almost entirely in XQuery, the translation algorithm described herein uses the relational operators whenever possible to leverage the relational capabilities of the query processor and to support queries that span both relational and XML data.

Before stating the above LINQ query on objects, data is represented in the object layer. That is, the XML types used in the Resume column are mapped to classes. FIG. 2a shows a portion of the mapping that associates ResumeType from the XML schema with a C# class TResume. The mapping is specified using XPath expressions, one for each class member. For example, the XPath "Address" retrieves all of the Address children of a Resume element, while the XPath "data (WebSite)" identifies the scalar value of the WebSite child element. Mappings may optionally specify conditions that need to be met on either the XML or object side or both, allowing a single XML schema type to be conditionally mapped to different classes, and vice versa.

A mapping needs to satisfy certain round-tripping conditions to enable lossless transformation of XML data into objects, or the other way around. A tool may generate a default mapping, which the developer can adjust or rewrite to suit the needs of the application. The query and update translation performed at runtime is decoupled from the schema translation algorithm used by the tool, which supports schema evolution and advanced mapping scenarios that require data reshaping. Once a set of classes is defined or generated, LINQ expressions that reference both classes that map to relational types and classes that map to XML types are constructed.

With respect to querying XML using loosely-typed objects and embedded XPath, note that not all XML schema types can be mapped to strongly-typed classes. For instance, the type of an XML element may be declared as "xsd:anyType", which cannot have a statically-typed object counterpart any more descriptive than "any XML data". Also, mixed-content elements are difficult to map to strongly-typed objects due to text nodes that may be present between child elements. Further, a developer may prefer to query persistent XML directly using XPath.

One example implementation described herein supports these scenarios by mapping XML schema elements to the .NET type "XElement". For example, in FIG. 2a the XML schema element Address, which has an unbounded number of occurrences, is mapped to a list of XElements. Each XPath axis has a counterpart in the object layer as a method of the class XElement.

The following LINQ query illustrates how strongly-typed and loosely-typed portions of the query can be used in a single expression. The nested subquery that ends with "Any( )" restricts the result to those job candidates who have at least one address with the postal code 98052. ModifiedDate has a .NET type DateTime, which has a member Year and is mapped to the relational type "datetime":

from c in db.JobCandidates
where c.ModifiedDate.Year <=2007 &&
    (from a in c.Resume.Address
    where (int)a.Element("{http:// . . . }Addr.PostalCode")
        ==98052
    select a).Any( )
select c.Resume.Name;

The above query is translated into the following SQL/XQuery expression:

```
SELECT C.Resume.query('*[1]/r:Name')
FROM Human Resources.JobCandidate AS C
WHERE DATEPART(year, C.ModifiedDate) <= 2007 AND
    EXISTS (SELECT 1
    FROM C.Resume.nodes('*[1]/r:Address') AS T(A)
    WHERE A.value('./r:Addr.PostalCode[1]', 'int') = 98052)
```

The nested subquery becomes a SQL EXISTS clause. The XPath accessor Element( ) is passed through and applied to the field variable A iterating over Address elements. The condition on the date is expressed using a built-in SQL function DATEPART. Each XML document returned by the query gets materialized on the client as an object of type TName, a strongly-typed class mapped to NameType in the XML schema.

For refactoring XML into relations, one example implementation introduces a level of data independence that isolates queries from a changing persistence model. The example allows for the relational and XML schemas of the database to evolve; the application code remains intact as long as the mappings are updated with the schema and can compensate for the changes. For example, the schema of FIG. 2a, block 202 (and the data to match) is altered so that the Education nodes are moved beneath a new EducationListing parent node, compensating for this change by appending the "EducationListing/" prefix to XPath expressions in the mapping that reference the Education nodes, without modifying the application. Moreover, the example allows data to change from relational to XML or vice versa. For example, the schema in FIG. 2b block 224 is a refactoring of the schema in block 222, where the original XML data has been partitioned across three tables containing relational and XML columns. Once the mappings are adjusted to conform to the new schema, the above-demonstrated queries still work, without alteration. For instance, the first LINQ query described above translates to the following SQL/XQuery after the refactoring:

```
SELECT R.EMail,
       E.value('./r:Edu.School', 'varchar(max)')
FROM Candidate AS C
INNER JOIN Resume AS R ON C.ID = R.ID
INNER JOIN ResumeDetails AS D ON C.ID = D.ID
CROSS APPLY D.Education.nodes('*') AS T(E)
WHERE R.EMail IS NOT NULL AND
   E.exist('./r:Edu.Degree[contains(.,"Bachelor")]')=1
```

With EMail stored in a relational column, the non-null condition in the LINQ query becomes a NOT NULL check instead of an element-existence condition on XML data.

Figure 3:
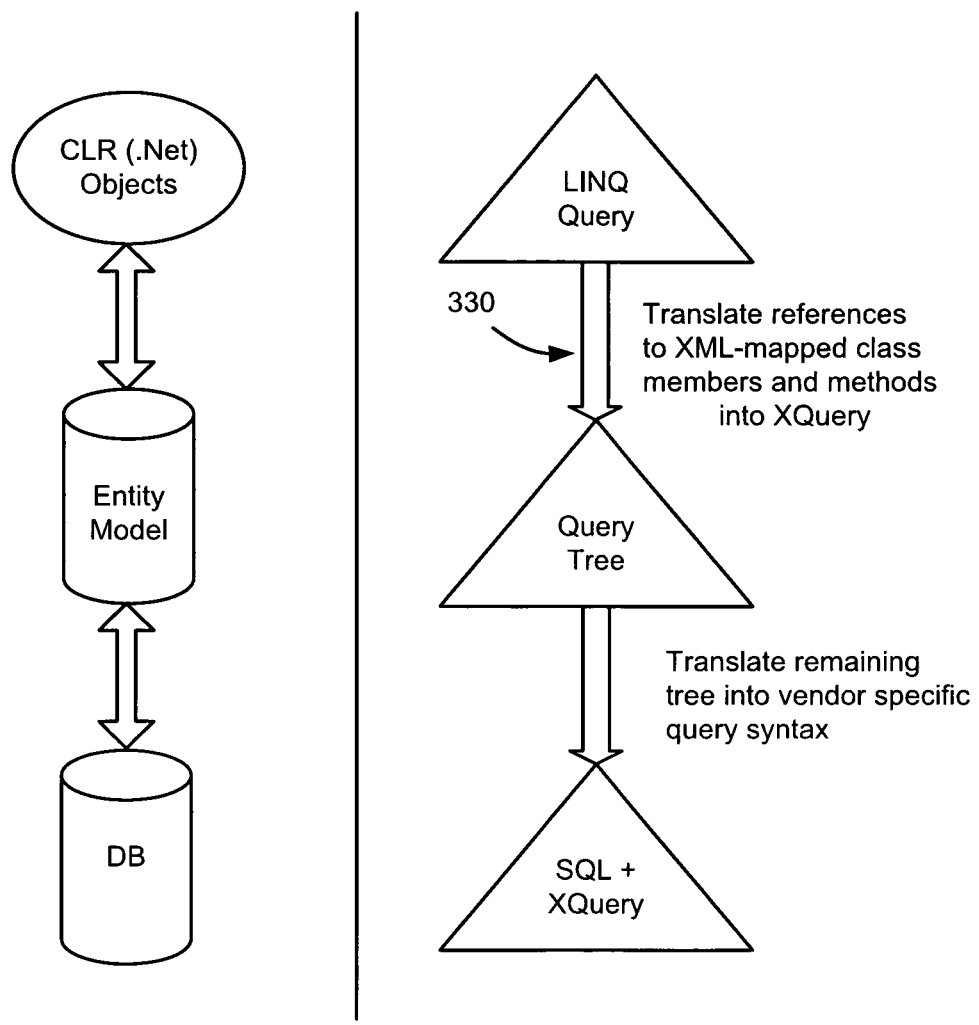
FIG. 3 is a representation of a view of one example implementation directed towards XML schema-based mappings to object structures.

Turning to FIG. 3, one example implementation builds on the ADO.NET Entity Framework, which enables applications to interact with the database via a conceptual entity model and an object surface that encapsulates conceptual types. The framework is extended by adding a new XML mapping layer. More particularly, the LINQ query translator 330 is modified as is the data provider for SQL Server to recognize XML mappings and embed XQuery statements into the generated SQL. This leverages multiple existing features and extensibility mechanisms of the Entity Framework to combine the XML and relational mappings. For example, user-defined functions are exploited to tunnel XML queries through the query pipeline; the Entity Framework's query rewriting mechanism is used to return nested collections in query results, which enables convenient query formulation over XML content. For instance, the query from c in db.JobCandidates select c.Resume.Address returns a collection of collections of XElements. The Entity Framework automatically flattens such queries prior to execution in the database and nests their results on the client. Further, Entity Framework's built-in support for .NET functions and data types, such as DateTime, is leveraged. Note that while the above description is based on Microsoft Corporation technology, there is no requirement to do so.

The ADO.net Entity Framework uses mappings to allow data stored in a database to be queried and updated as CLR objects. In a current implementation, the framework exposes data stored as XML in the database as strings of XML. One can use an additional layer of mappings to expose that XML as CLR objects or as LINQ-to-XML elements or as any level of shredding resolution in between. This also demonstrates that this approach is possible with few alterations to the existing code.

Figure 4:
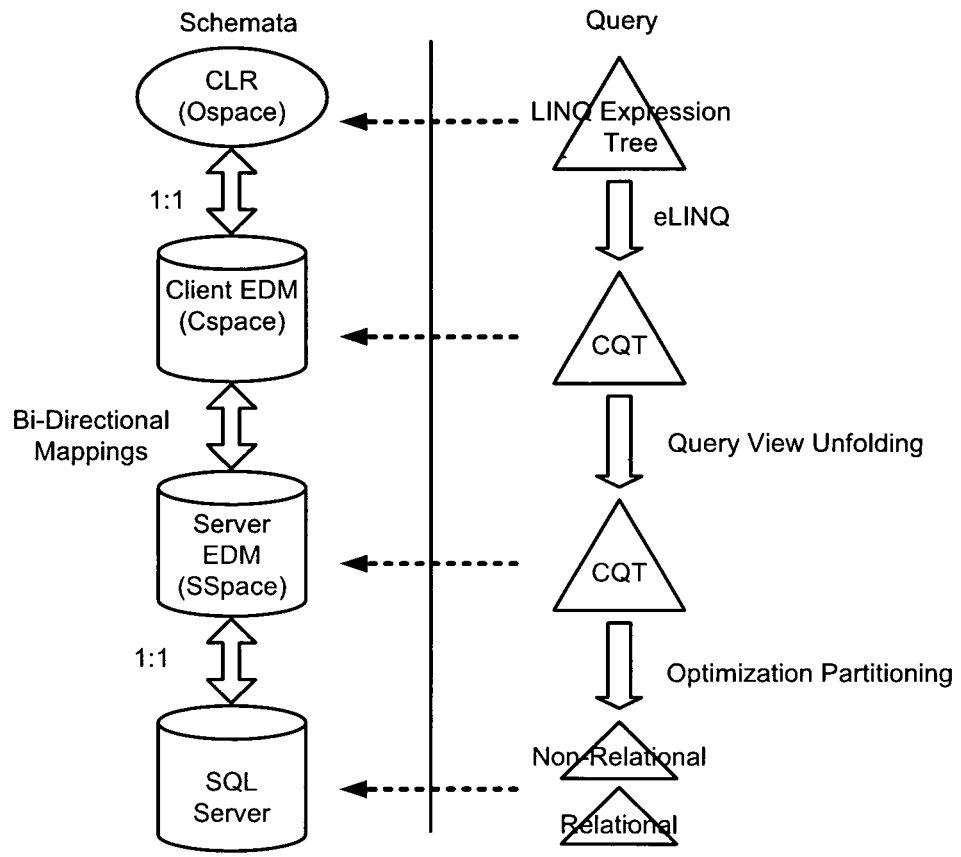
FIG. 4 is a representation of the relationship between classes and objects in a CLR (common language runtime) environment and data objects in a store.

FIG. 4 shows a relationship between the classes and objects in the programmer's CLR environment and the objects in a store, such as SQL Server, in the current conception of the ADO.net Entity Framework. Objects in the CLR (OSpace) represent entities and sets of entities in the client entity data model (CSpace) that are mapped to tables in persistent storage (SSpace, physical database). These CLR objects can then be queried and updated at runtime, and those queries and updates propagate transparently to the store through these mappings.

There is a mismatch in expressive power within this diagram. The physical storage level may have data that is stored in a column whose data type is XML, and the DBMS holding the data may allow queries against the XML data in the form of XQuery or XPath. Through LINQ-to-XML and other .Net capabilities, these same queries can be posed in OSpace as well. However, both CSpace and SSpace are incapable of handling these functions. Thus, while relational queries expressed in OSpace can be passed to the server to execute, XML queries in OSpace need to execute locally on the client.

In addition, the one-to-one restriction on mappings between OSpace and CSpace further limits the capabilities of the programmer. The objects in OSpace need to align exactly with the objects in CSpace, meaning that if a property has XML type in CSpace, it has to have XML type in OSpace. The programmer cannot interact with that data as shredded objects unless the programmer performs the shredding manually on the client side. There is herein supported an environment where the mappings between CSpace and OSpace handle the shredding so that the programmer can interact with objects exclusively, XML exclusively or anywhere in between.

Figure 5A:
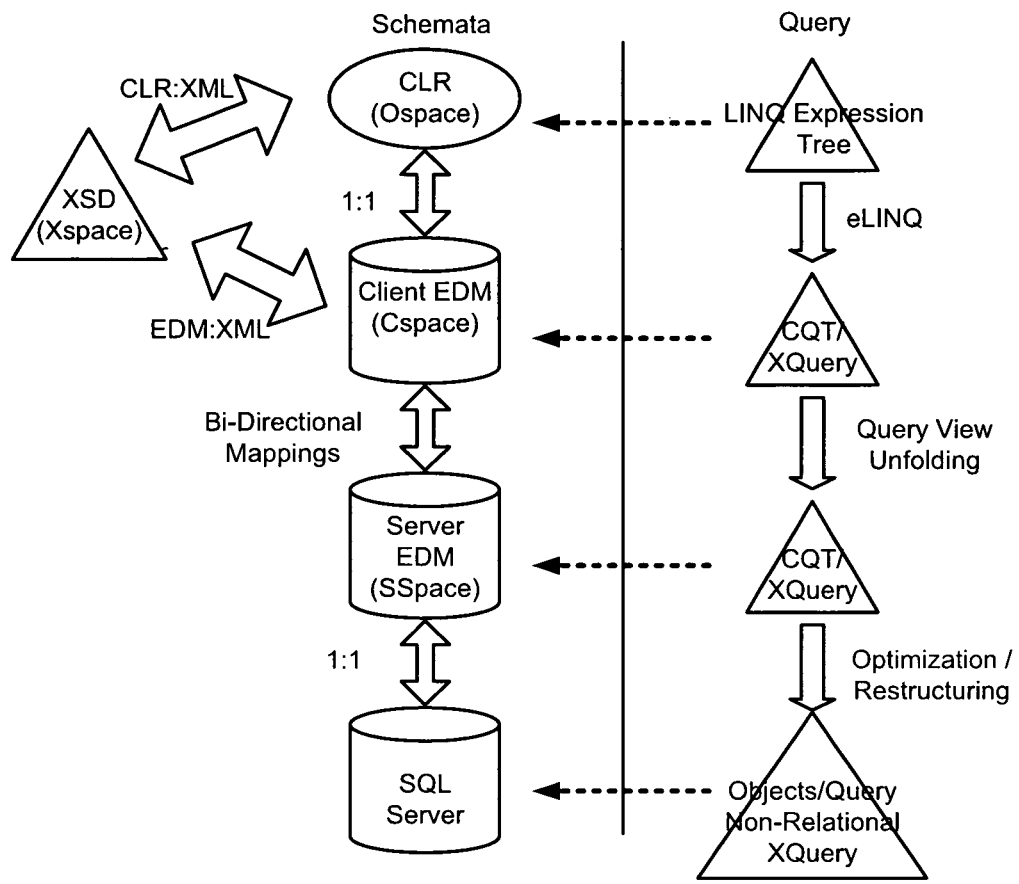
FIGS. 5a and 5b are representations showing data as XML documents with a corresponding schema, with mappings to client spaces, with query transformation steps across the mappings.

A new client-side view of the data is provided as entirely XML (XSpace), in addition to the OSpace and CSpace. This model of the data flow between client and server (FIG. 5a) leaves the interaction between CSpace, SSpace, and persistent storage intact, but allows for more expressive mappings within the client layers. While a developer may start with any of the three client-side views and use default mappings or more complicated custom ones to generate the other, for simplicity a number of assumptions are made which are likely to be valid in terms of how users may want to use these features.

First, it is assumed that objects in OSpace are at least as shredded as objects in CSpace. This assumption means that if an object is expressed as a type with properties in CSpace, it will be a class with properties in OSpace and not wrapped inside an XML tree. Conversely, if an object is represented as XML in OSpace, it is also represented as XML in CSpace. The net result of this assumption is that an XQuery in OSpace will still be an XQuery in CSpace.

Second, an EDM type will be mapped to a CLR class, and non-XML properties will be mapped to CLR properties, similar to the one-to-one way that they are in the existing implementation. In other words, the assumption is that when composing the CLR:XML and EDM:XML mappings (FIG. 5a), each type in CSpace still maps to a class in OSpace, and that association could have been specified using the language in the currently-available CSDL specification.

Figure 5B:
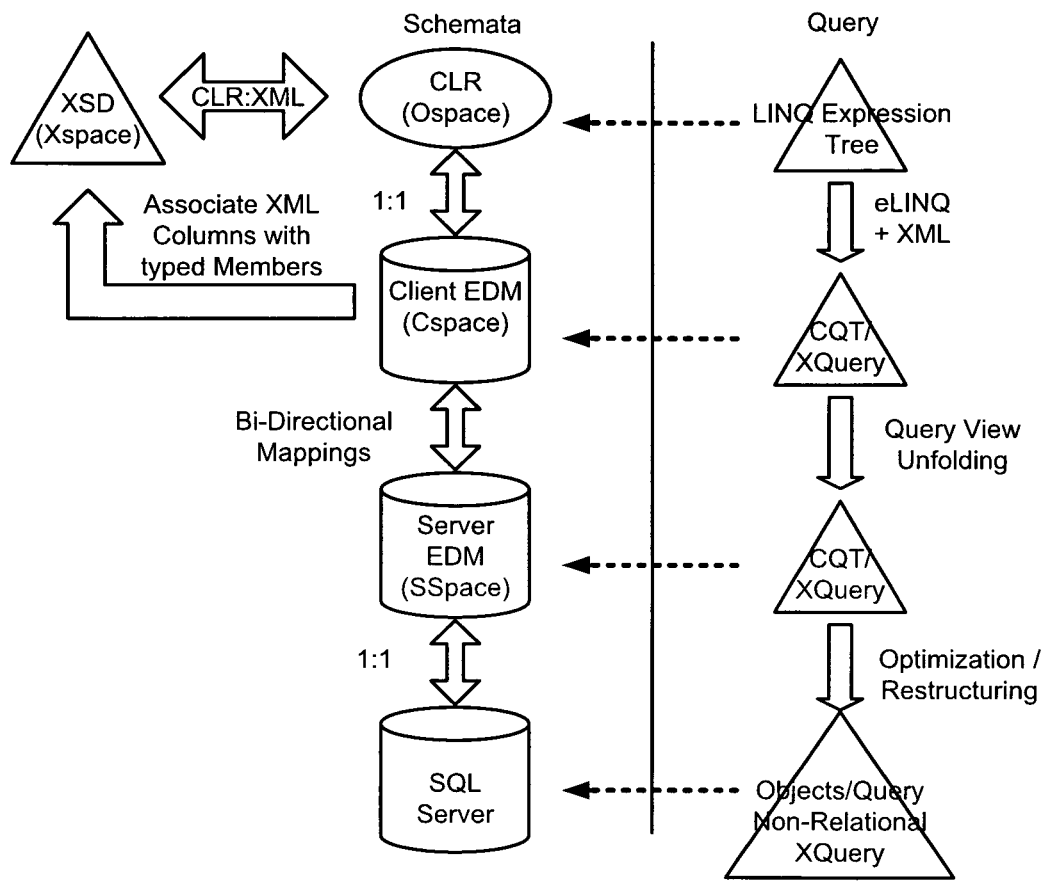

The net effect of these assumptions provides a situation where the OSpace representation is the same as the CSpace representation, but with the possibility that CSpace XML columns have been partially or totally shredded into classes in OSpace. With these assumptions in place, the EDM:XML mappings are no longer necessary except to associate XML-mapped members with their CSpace string counterpart, resulting in the architecture in FIG. 5b.

As described above, the HumanResources.JobCandidate table in the AdventureWorks database contains an XML-typed column called Resume. This column is strongly-typed, in that the contents must be validated against a schema collection (see Appendix B for details). What is wanted is to expose the JobCandidate table as a CLR type, as with the normal ADO.net implementation—with the Resume data shredded across a collection of classes, so that the Resume data may be manipulated as objects in OSpace instead of XML.

A full example is in the appendices, with some highlights described herein. As represented in FIG. 2b, a full resume comprises a name; a list of skills; collections of addresses, educations, and employments; a telephone number; an e-mail address; and a website. Resume is represented as a class with the following type definition:

```
public partial class ResumeType
{
    public NameType Name;
```

-continued

```
    public string Skills;
    public IEnumerable<EmploymentType> Employment;
    public IEnumerable<EducationType> Education;
    public IEnumerable<AddressType> Address;
    public TelephoneType Telephone;
    public string EMail;
    public string WebSite;
}
```

An aspect is to be able to see data, query data, and update data of type ResumeType (or EmploymentType or EducationType, etc.) and transparently take those actions and push them to the server. In other words, the following query is to compile and run on the server, even though WebSite is a data item that exists deep inside an XML column:

```
var q2 = from o in __data.JobCandidates
         where o.ID <= 5
         select o.Resume.WebSite;
```

To support XML mappings, two property-usage attributes are added. More particularly, any properties that are not part of the direct one-to-one mapping between OSpace and CSpace cannot be marked by the usual EdmScalarProperty or EdmComplexProperty attributes used in the current conception of the ADO.net Entity Framework; the resulting class would fail a check that compares the number of EDM properties between OSpace and CSpace types.

Two additional attributes are thus provided:

XmlMarshaled: This attribute marks a property as the object representation of an XML column XmlMarshaledAsXml: This attribute marks a property as the representation of an XML column as an XElement, as opposed to a string value holding XML text.

```
Usage:
    public partial class JobCandidate
    {
        [XmlMarshalled("ResumeXml")]
        public ResumeType Resume;
        [XmlMarshalledAsXml("ResumeXml")]
        public XElement ResumeAsXml;
    }
```

In this example, the property "ResumeXml" is a string-typed property in the class JobCandidate, auto-generated as an EdmScalarProperty by the EdmGen.exe tool, which is part of the ADO.net Entity Framework. These two additional properties simply represent the same data, but as shredded objects (Resume) and as an XML document (ResumeAsXml).

It should be noted that the XmlMarshaledAsXml attribute is only needed because CSpace EDM instances do not support columns of XML type directly, but only as strings. If Entity Framework were changed to natively support XML as a client-side type, the XmlMarshaledAsXml attribute may be dropped.

As an MSL file specifies mappings between CSpace and SSpace, mappings are needed to connect CSpace, OSpace, and XSpace. The mapping between CSpace and OSpace is currently handled by annotations in the CSDL file, because the mapping is effectively one-to-one. That assumption no longer holds with an XSpace intermediary present.

Mapping between OSpace and XSpace is done using CLR:XML mappings. Like MSL mappings, CLR:XML mappings are done on a type-by-type basis. For instance, the following exemplifies mapping the JobCandidate class to its corresponding type in the XSD, where there is a type called TJobCandidate:

```
<Template ClrType="clrAw.JobCandidate"
XmlType="xsdAw:TJobCandidate">
    <Map Member="ID"           As="data(@ID)"/>
    <Map Member="EmployeeID"   As="data(xsdAw:EmployeeID)"/>
    <Map Member="Resume"       As="xsdRs:Resume"/>
    <Map Member="ModifiedDate" As="data(xsdAw:ModifiedDate)"/>
</Template>
```

The Member facet of a map describes the CLR property to map, and the As facet is an XPath expression describing how to access into the TJobCandidate type to get data for that property. The "data" function, a built-in function in the XQuery function library, indicates that the target is a scalar value and can be directly cast.

The following sets forth another example of a CLR:XML mapping:

```
<cx:Template ClrType="a.ResumeType" XmlType="r:ResumeType">
    <cx:Map Member="Name" As="r:Name" />
    <cx:Map Member="Skills" As="data(r:Skills)" />
    <cx:Map Member="Employment" As="r:Employment" />
    <cx:Map Member="Education" As="r:Education" />
    <cx:Map Member="Address" As="r:Address" />
    <cx:Map Member="Telephone" As="r:Telephone" />
    <cx:Map Member="EMail" As="data(r:EMail)" />
    <cx:Map Member="WebSite" As="data(r:WebSite)" />
</cx:Template>
```

The JobCandidate type exists in all three client spaces. However, the ResumeType type does not exist in CSpace. This type exists only within an XML column of the CSpace type, so we call it an XML-mapped type.

Maps may be specified between XSpace and CSpace using a similar syntax as CLR:XML maps. This mapping can be used for evaluating XPath/XQuery/XLinq queries against the XML schema. For example:

```
<Template EdmType="edmAw.JobCandidate"
XmlType="xsdAw:TJobCandidate">
    <Map Member="ID"           As="data(@ID)"/>
    <Map Member="EmployeeID"   As="data(xsdAw:EmployeeID)"/>
    <Map Member="ResumeXml"    As="xsdRs:Resume"/>
    <Map Member="ModifiedDate" As="data(xsdAw:ModifiedDate)"/>
</Template>
```

The above example shows the mapping for JobCandidates between XSpace and CSpace. With one exception, this mapping is identical to the CLR:XML mapping, whereby a composition between the two mappings yields a one-to-one relationship between fields, as before.

An exception is the Resume attribute (seen here as ResumeXml). The data maps to the same location in both maps (xsdRs:Resume), but there is a type mismatch. The CSDL lists ResumeXml as a string value. The ResumeXml property is available as a string in the CLR type as well (to maintain the one-to-one mapping between CSpace and OSpace), but the XmlMarshaled attribute handles the connection between the two properties. In the future, the string representation may be made private and hidden from the user, to avoid exposing two different representations of the same data that may later need to be synchronized.

The services that are needed from these mappings are encapsulated in an object called XmlConnection and include the following:

Given a CLR type T and an XML fragment, transform the fragment into an object of type T Given an XML-mapped CLR property, determine the XML column and the XQuery expression to extract the correct data from the column Given an object, serialize it into XML and compare it against an existing XML fragment to determine if an update has been made The XmlConnection object reads in the CLR:XML and EDM:XML mappings and creates type-specific templates that perform these services.

Figure 6:
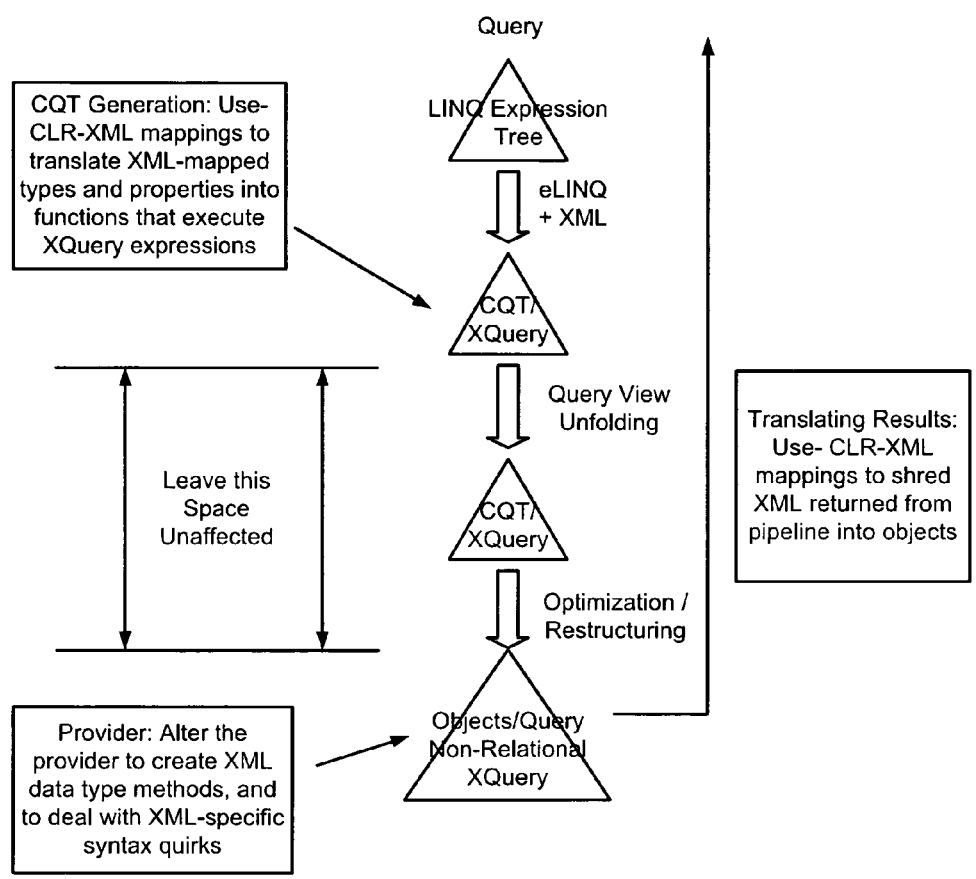
FIG. 6 is a representation showing additions to a query transformation architecture.

FIG. 6 demonstrates example changes to an existing EDM, which are as small as possible; some areas of the EDM are not altered. For instance, there are no edits to the way EDM handles mappings from CSpace to SSpace or from SSpace to persistent storage. Query optimizations or unfoldings that happen in that space are not edited. This is accomplished by reusing existing types and structures within the EDM, e.g., XQuery applications are treated as ordinary functions, which the mappings already know how to process.

The changes in FIG. 6 are reflected in three places in the example implementation, namely:

References to XML-mapped properties or types in a LINQ expression tree must become nodes in the internal representation of a query, called a canonical query tree (CQT). These are DbFunctionExpression nodes that take an XQuery expression as a parameter.

The data provider needs to be able to translate applications of XQuery into constructs in the native query language of the database. For SQL Server, this means creating calls to the XML data type methods, such as ".value".

Any XML fragments returned as part of a query into objects are translated.

A fourth area that is changed (not shown in FIG. 6) pertains to updates to data. Any changes made to objects that are XML-mapped translate into changes to the XML column in the data store.

The following describes some of the extensions of the CQT generation process. A new method to DbCommandTree is added—CreateXMLFunctionExpression—that creates a DbFunctionExpression object with some specific characteristics. There are four different XML functions supported:

xmlquery: corresponding to a call to the .query(xqueryexpression) method in SQL Server on a value of xml data type, with a return type of XML xmlexists: corresponding to a call to the .exist(xqueryexpression) method in SQL Server on a value of xml data type, with a return type of Boolean xmlvalue: corresponding to a call to the .value(xqueryexpression, type) method in SQL Server on a value of xml data type, whose return type is determined by the type parameter xmlnodes: corresponding to a call to the .nodes(xqueryexpression) method in SQL Server on a value of xml data type, whose return type is a collection of xml nodes The CreateXMLFunctionExpression takes four arguments:

The function name (one of the four above)

A DbExpression representing the object on which to execute the function

A string representing the XQuery expression to execute on the server

An optional type argument, to determine the output type for the xmlvalue function A reference to an XmlConnection is added to the MetadataWorkspace, and the XmlConnection initialized when an EntityConnection is made. The XmlConnection primarily contains the CLR:XML mappings and the EDMXML mappings, as well as the functionality to move between objects and XML in those spaces by shredding/marshaling according to those mappings.

The IsTranslator component, which handles the conditional expression "IS" in LINQ, is changed in the case where the types are XML-mapped. In the expression (o is T), where T is a class, the compiler checks to see that object o is already of some supertype of T (or else the compiler returns an error, saying the expression will always be false). Thus, an assumption is made that both object o's type and type T are XML-mapped. In that case, if object o has declared type T0, the difference between the two can be one of the following:

Types T and T0 both map to the same XML type in XSpace, but T has a condition specified in the CLR:XML mapping Types T and T0 map to different XML types in XSpace, related to one another by an extension in the XML schema A combination of the above In the first case, the "IS" statement is changed into a call to the "xmlexists" function, whose XQuery argument is the condition specified in the CLR:XML mapping. In the CLR:XML mapping, the assumption is that conditions are disjoint—if both T1 and T2 are subtypes of T using conditions, then their conditions must not overlap. However, that is also the case for subtypes of subtypes, as in:

T1 is a subtype of T0, specified by condition
T2 is a subtype of T1, specified by condition
T3 is a subtype of T1, specified by condition CLR:XML mappings do not support stacked conditions. In the above case, T2 and T3 are defined as conditions on T0, not T1. So, to translate (o is T1), it is turned into the following:

(o.exist(T1 condition)) or (o.exist(T2 condition)) or (o.exist(T3 condition))

In the second case, the "xmlexists" function is also used, with a test for the xsi:type attribute (since, according to the semantics of XML schemas, the type of a node is exactly the declared type that is expected according to the schema, unless specified explicitly by the xsi:type attribute—the XML parser in SQL Server subscribes to these semantics). In the third case, there is built a conjunction between the output of the first two cases.

Considering AsTranslator in CQT generation, which handles the conditional expression "AS" in LINQ, in the case of XML-mapped types, the AS operator is effectively a no-op. The return type is going to be XML, both before applying the AS and after. And, casting to the correct type will be handled by the casting operation during object materialization. So, a test makes sure that the correct type information is present in XSpace.

Most of the functionality for supporting XML-mapped members and types occurs in the method MemberAccessTranslator.TryResolveAsProperty. References to properties, whether they are scalar, complex, or collection types, are translated into XML functions here. If the property is a collection type, the "xmlnodes" function is used. If the property is a scalar type, the "xmlvalue" function is used, and cast to the correct scalar value type. If the property is a complex type but not a collection, the "xmlquery" function is used. In these cases, if function calls are discovered to be stacked on top of one another, an attempt is made to combine their XQuery expressions to reduce the number of method calls and the size of the query tree. For a non-scalar property, the return type is set to "string" (or collection of "string") assuming that the return values will be XML fragments that will be parsed into objects by the ObjectMaterializer casting.

The example implementation creates the XQuery expression for a given property from the CLR:XML mappings, and looks up the declaring type of the property, looks up that type in the mappings, and pulls the XPath expression corresponding to the Map facet for that property. For a reference to a property that is marked as XmlMarshaled, a translation is made into a call to "xmlquery" with an XQuery expression of "/*[1]" to indicate retrieving the root node of the tree.

By way of example, consider the LINQ expression:
From o in _data.JobCandidates select o.Resume.Name
In the XQuery expression o.Resume.Name becomes xmlquery(o, "/*[1]/Name").

In the EqualsTranslator, there is one special case that is accounted for. Consider a query with a where condition as below:
p.TestMultipleRootsTyped.Type==TestMultipleRoots.Switch.TypeB This equality test happens to match exactly a CLR condition in a CLR:XML mapping:

```
<cx:Template ClrType="a.TestMultipleRoots" XmlType="r:TypeB">
    <cx:ClrCondition Member="Type" Value="TypeB"/>
    <cx:XmlCondition Name="r:TypeB"/>
    <cx:Map Member="TypeB" As="."/>
</cx:Template>
```

In this case, the equality condition should not be pushed down to the server as it is, since that member does not exist on the store. Instead, the expression is replaced with a type test, to effectively add the predicate "where p.TestMultipleRootsTyped is TypeB" and translate that into the equivalent XQuery expression on the store.

In MethodCallTranslator translators are added for several of the LINQ-to-XML axis methods. For example:
- A call to .Element(elementname) is translated into an "xmlquery" function whose path argument is "/elementname[1]".
- A call to .Elements( ) is translated into an "xmlquery" function whose path argument is "/*".
- Each translator looks to see if the base element is also an xml function call, so that stacked calls are collapsed. A call to "/Address" followed by a call to "/StreetLocation[1]" does not result in two "xmlquery" functions, but rather a single one with argument "/Address/StreetLocation[1]".
- Additional translators could be added for each axis method (e.g., ancestors, elements-before-self, parent) easily, as long as they translate cleanly into an XPath expression.
Translators are also added for two string methods:
- A call to "substring" is translated into an "xmlvalue" function that calls the XQuery substring function. The xmlvalue function has string-typed output.
- A call to "contains" is translated into an "xmlexists" function that calls the XQuery contains function, but only if the method argument is a constant. If the argument is not a constant, it is difficult (if not impossible) to derive a correct XQuery expression, so we leave it as its SQL equivalent.

In ExpressionConverter, the CreateCastExpression is altered to recognize if it is casting XML. Because casting in XML is done using the "xmlvalue" function, an instance of that function is created with the casting target type as its output type. If there was already an "xmlvalue" function present, its output type is changed to the casting target type, thus avoiding unnecessarily stacking function calls.

A namespace resolver object is added to the DbQueryCommandTree so that the tree can track the relationships between namespaces and their aliases, as well as a list of the aliases that are being used in the current query. PlanCompiler is modified to propagate these new additions to the query trees that get sent to the provider.

In ValueExpression, a constant expression is needed to hold a value of type XName, to support arguments given to LINQ-to-XML method calls.

In the Provider, the SqlGenerator is changed to add handlers for xml functions. There are methods that translate calls to "xmlexists", "xmlquery", "xmlvalue", and "xmlnodes" into the corresponding xml data type methods and parameters. At this point, if the provider detects that there are still nested calls to xml functions (e.g., an xmlvalue function operating on the result from xmlquery), it combines the XQuery expressions from the calls into a single query.

Some additional changes that were made include:
- Changing a reference to "xml method IS (NOT) NULL" to a call to .exist(XPath)=0 or 1, since xml methods return default values for domains rather than null values.
- Normally, if a query contains an APPLY expression, the "right" argument to the APPLY gets its own alias that can be used as a scalar elsewhere in the query. When the argument is a call to the "nodes" xml method, this syntax is invalid. So, provider changes the alias (say, [extent1]) to having an artificial table name and single column (say, xml0([extent1])). With this fix, the rest of the query generation and processing works as normal.
- When XML data is returned from a subquery, it is wrapped in an artificial document node to make it into a valid XML document. This throws off XQuery expressions in the outer query, because they have not been altered to dereference the extra level. The provider methods that generate the xml method calls are altered so that they reference absolute locations and all dereference the first level to retrieve the root node.
- Data that is returned by the xmlnodes function cannot be read raw—it needs to be passed to one of the query, value, or exist methods. The provider detects cases where the query potentially has none of these methods where one is required, and inserts the no-op query('.').
- If any namespace aliases are present in the query tree, add a WITH XMLNAMESPACES clause.

When translating results, the static method ObjectMaterializerHelper.CastReference performs a cast of an object into a specific type as it is passed back from the server. With an XSpace intermediary present, these castings may become session-specific for at least two reasons:
- If the object is of type T but type T has some properties that are marked as XmlMarshaled, there is a need to populate those properties from the XML that is stored in the source property. Otherwise, the XmlMarshaled properties will always be null. For instance, if a query returns a collection of JobCandidates, the Resume (and ResumeAsXml) fields need to be filled in from the contents of the ResumeXml property.
- If the object is of type string, and needs to be cast as type T where T is an XML-mapped type, the object needs to be sent to an XmlConnection for shredding. For instance, if a query returns a collection of type AddressType, which is an XML-mapped type, the input to the cast method will not be an object, but an XML fragment as returned by an XQuery expression, and must be shredded.

Therefore, the example implementation alters the ObjectMaterializerHelper methods to take a metadata workspace as a parameter to allow for session-specific casting to and from XML. Several changes are made elsewhere to accommodate this, as well, including:

- Change ObjectMaterializerHelper<T> fields and properties into methods, so that they may be parameterized with a metadata workspace object.
- Change the delegate creators to pass in a metadata workspace as the default first argument, as follows:
  return Delegate.CreateDelegate(methodType, metadataworkspace, methodInfo.MakeGenericMethod(type));
- Change InitializerFacet.AlignTypes<T> to accept a metadata workspace as an argument.
- AlignTypes<T> is used inside a LINQ expression that is generated at runtime, so change references to AlignTypes<T> to also accept a metadata workspace as a parameter, and change the resulting delegate type to <object[ ], MetadataWorkspace, object> (e.g., CreateValueAccessor).
- Pass the metadata workspace object as an extra argument any time the above LINQ expressions are compiled and used.

For translating updates, a change has been made to ObjectContext.SaveChanges to accommodate saving changes to XML-mapped members. Each object whose state is being managed by the object context is sent to XmlConnection.SyncXmlMembers. This method takes all of the XML-mapped members, re-marshals them as an XML string, compares it against the existing string, and changes it if it has changed. This process allows the existing update mechanism to propagate the change by updating the entire XML column at once.

EXAMPLES

Query

Filter and Project on XML Scalar Attributes

```
var q = from o in __data.JobCandidates
    where o.Resume.Skills.Contains("production")
    select o.Resume.Name.Name__Last;
Output:
SELECT
[Extent1].[Resume].query(N'declare namespace
r="http://schemas.microsoft.com/sqlserver/2004/07/adventure-works/
Resume";
/*[1]/r:Name/r:Name.Last').value(N'.', N'nvarchar(max)') AS [C1]
FROM [HumanResources].[JobCandidate] AS [Extent1]
WHERE cast(1 as 'bit') = [Extent1].[Resume].exist(N'declare namespace
r="http://schemas.microsoft.com/sqlserver/2004/07/adventure-works/
Resume";
/*[1]/r:Skills[contains(.,"production")]')
Query: filter and project on XML complex attributes, returned
inside an anonymous type
    var q = from o in __data.JobCandidates
        where o.Resume.Telephone != null
        select new { A = o.Resume.Name, B = o.ModifiedDate };
Output:
SELECT
[Extent1].[Resume].query(N'declare namespace
r="http://schemas.microsoft.com/sqlserver/2004/07/adventure-works/
Resume";
/*[1]/r:Name') AS [C1],
[Extent1].[ModifiedDate] AS [ModifiedDate],
cast(1 as bit) AS [C2]
FROM [HumanResources].[JobCandidate] AS [Extent1]
WHERE [Extent1].[Resume].exist(N'declare namespace
r="http://schemas.microsoft.com/sqlserver/2004/07/adventure-works/
Resume";
```

```
/*[1]/r:Telephone') = 1
Query: filter and enumerate on collection type
    var q = from o in
        (from o in __data.JobCandidates
        from e in o.Resume.Education
        where o.ID < 7
        select e)
        select o.Edu__Degree;
Output:
SELECT
[Extent2].query(N'declare namespace
r="http://schemas.microsoft.com/sqlserver/2004/07/adventure-works/
Resume";
./r:Edu.Degree').value(N'.', N'nvarchar(max)') AS [C1]
FROM [HumanResources].[JobCandidate] AS [Extent1]
CROSS APPLY [Extent1].[Resume].nodes(N'declare namespace
r="http://schemas.microsoft.com/sqlserver/2004/07/adventure-works/
Resume";
/*[1]/r:Education') AS [xml0]([Extent2])
WHERE [Extent1].[JobCandidateID] < 7
```

The mapping language in one example implementation includes a subset of XPath. It allows an expression of the form Name[condition], where Name is any qualified name and condition is either a position reference (or last( )) or an interval condition. One can also use the @ symbol to represent an attribute and the data( ) method to demonstrate that the value is of scalar type. Finally, one can specify a comma-delimited list of such expressions to represent a union of the results of each expression.

The earlier examples also allowed conditions between the CLR and XML types. For instance, CLR type X may only map to XML type Y if the value of property X.M is 10. Some of the conditions allowed by one example implementation are:

- A condition on the value of a CLR type member
- A condition on the existence of an XML type member
- A condition on the value of a scalar XML type Other condition types are needed to handle certain situations. For example, it is useful to handle multiple-step paths like Name1/Name2/Name3. Only allowing single steps means that the structure of the XML elements has to closely resemble the CLR objects, where every type/member relationship in CLR translates directly to a parent/child relationship in XML.

An improved, example implementation provided herein allows mappings of the form Name1[condition1]/Name2[condition2]/ . . . /NameX[conditionX], where each condition in the chain is optional. One restriction is that only the last condition (in this case, conditionX) can be an interval condition or a reference to the last( ) position—this is because when constructing XML elements out of objects, the parent nodes need to be an absolute position (to add elements to the correct parents). Interval conditions and the last( ) position can point to variable locations throughout the construction process.

In general, having multiple steps allow more variety in the mappings and in the XML schemas that can map to a given CLR type. For example, having multi-step mappings means that either of the following may be mapped to an IEnumerable member in a CLR object:

```
Using map r:ListItem ---
    <r:ListItem>10</r:ListItem>
    <r:ListItem>8</r:ListItem>
    <r:ListItem>4</r:ListItem>
    <r:ListItem>13</r:ListItem>
Using map r:Parent/r:ListItem ---
```

```
<r:Parent>
    <r:ListItem>10</r:ListItem>
    <r:ListItem>8</r:ListItem>
    <r:ListItem>4</r:ListItem>
    <r:ListItem>13</r:ListItem>
</r:Parent>
```

It is possible for elements of the same type to appear with different element names. Suppose that two different elements named N1 and $N_2$ share the same underlying type T. When constructing an element of type T, one needs to give the element a name. If the element appears as a child element, an example implementation can get the element name from whatever the parent element expects or the mapping dictates. However, if the element appears as a root element, there is no context from which to pull the element name. In fact, if multiple root elements with the same type but different names appear in a schema, the previous version of the prototype would throw an error.

To accommodate this situation, a new mapping condition is added that tests the name of an element:

```
<cx:Template ClrType="a.TestRootOverlap1"
XmlType="r:OverlapType">
    <cx:XmlCondition Name="r:Type1"/>
    <cx:Map Member="Field1" As="data(r:Field1)" />
    <cx:Map Member="Field2" As="data(r:Field2)" />
</cx:Template>
<cx:Template ClrType="a.TestRootOverlap2"
XmlType="r:OverlapType">
    <cx:XmlCondition Name="r:Type2"/>
    <cx:Map Member="Field1" As="data(r:Field1)" />
    <cx:Map Member="Field2" As="data(r:Field2)" />
</cx:Template>
```

These mappings differentiate between nodes with the different names but same XML type, to enable the CLR type itself to divine the needed name. An XML element of type OverlapType and name Type1 becomes type TestRootOverlap1, and so on. One possible CLR object surface for this mapping might employ a common subclass with empty extensions just to distinguish the names:

```
public partial class TestRootOverlap
{
    public string Field1;
    public int? Field2;
}
public partial class TestRootOverlap1 : TestRootOverlap { }
public partial class TestRootOverlap2 : TestRootOverlap { }
```

A dictionary is an abstraction of a one-to-one function. In CLR, a dictionary is a list of key-value pairs that can also, when given a key value, return the associated target value. XML can represent a dictionary as a list of key-value pairs, but has no native dictionary abstraction. Therefore, there is no single XQuery expression that can "construct" a dictionary. The following is an example of an XML representation of a dictionary:

```
<SalesAccountAliasTable>
    <Alias>
        <AccountID>1</AccountID>
        <SalesPerson>Alice</SalesPerson>
    </Alias>
    <Alias>
        <AccountID>2</AccountID>
        <SalesPerson>Bob</SalesPerson>
    </Alias>
    <Alias>
        <AccountID>3</AccountID>
        <SalesPerson>Alice</SalesPerson>
    </Alias>
    <Alias>
        <AccountID>4</AccountID>
        <SalesPerson>Cindy</SalesPerson>
    </Alias>
</SalesAccountAliasTable>
```

To support mapping between a Dictionary object in CLR and its representation in XML, the pseudo-function "dictionary" is included in the syntax of possible mapping expressions. The function takes three arguments:

The XPath expression to find the key-value pairs, where each pair is encapsulated in an element The qualified name of the "key" element within the pair The qualified name of the "value" element within the pair Within each pair, it is assumed that the key comes before the value, so that the expression /*[1] will pull the key element and /*[2] will pull the value element, in case the key/value names are not available when constructing a query. Both the key and the value can be of scalar or complex type, though this distinction is made by the expected CLR type rather than marking the names with the "data" function.

The following is an example of a mapping element that uses the dictionary pseudo-function:

<cx:Map Member="SalesAlias" As="dictionary(d:Alias, d:AccountID, d:SalesPerson)"/>

One reason for adding dictionaries to the language of possible mappings is Data Contracts (described below). The tools and services surrounding Data Contracts treat dictionaries as a special case. Dictionaries are treated as lists, where each list item has the key-value pair structure. Moreover, Data Contracts allow the developer to control the element names of the pair, key, and value elements. Contracts may be used as a possible guideline for generating mappings, including whatever special cases they support where possible.

Dictionary use in LINQ queries is supported in different ways, e.g., to support returning a dictionary in the select clause, such as this:

```
var q1 = from p in xtt.People
    where p is Provider
    select (p as Provider).History;
```

In this example, History is a dictionary object. Secondly, there is support for using a dictionary in the from clause in the following way:

```
var q1 = from p in xtt.People
    from q in (p as Provider).History
    select q.Value;
```

The select clause cannot currently return the key/value pair itself, but can return the key or the value independently.

Self Mapping is an aspect that adds, to the expressive power of the mappings language, the ability to map to "self", as in:

<cx:Map Member="TypeC" As="."/>

This allows moving from a parent type to a member in CLR space without having to move from parent to child in XML space.

Another addition to the mapping capabilities relates to subtypes of collections, such as:

public partial class CertificationsType: List<CertificationType>{ }

Such declarations often occur in the context of data contracts (described below). A problem with this situation is that the class has no declared members, so using the "Map" CLR:XML declaration does not work. Rather than map a member to a path, what is provided is a way to declare that the collection elements can be found at a particular location:

```
<cx:Template ClrType="a.CertificationsType"
    XmlType="r:CertificationsType">
  <cx:MapElements As="Certification"/>
</cx:Template>
```

The program EdmGen.exe that generates mappings has a mode called "FullGeneration" that takes a database instance and creates the necessary files and metadata for the Entity Framework to function in a "bare bones" capacity, where mappings are one-to-one. The relevant files that it generates are:

A store model (ssdl)
A client model (csdl)
A trivial client-store mapping (msl)
An object layer (.cs or .vb files that represent the object surface)

These files represent a default mapping between levels in the framework, which is sufficient to get a developer up and running. Someone can then go back and manually alter the artifacts later, or use a tool to generate more application-specific mappings.

EdmGen is modified so that it can generate CLR:XML mappings and the XSpace artifacts using the same paradigm. It generates mappings that may not be ideal, but are functional and demonstrate a working model that one can edit later. At some point, a graphical tool could be written to generate richer mappings with more indirection.

Four additional artifacts are generated:
The XML schemas
The OSpace class definitions for the XML-mapped objects
The CLR:XML mapping between OSpace and XSpace
A "sidecar" file that extends the relation-mapped classes The XML schemas are obtained by looking at the database instance and using the XML_SCHEMA_NAMESPACE function in SQL Server (this is the only phase that is SQL Server-specific). The OSpace classes are generated (and the CLR:XML mappings as well, simultaneously) by looking at each XML schema type and making some default decisions:

Elements with the minOccurs="0" facet become nullable types

Elements with the maxOccurs facet become IEnumerable types

Elements with a choice element create a field for each possible choice

Elements of type anyType or that do not fit any known pattern become an XElement One CLR type is generated per XML type, one CLR member per XML child element (or repeated element).

The sidecar file is also generated. This file associates a strongly-typed CLR member with an existing CLR member of an existing, relationally-mapped class that holds opaque XML data to be shredded. An association is made using the XmlMarshaled attribute (described above). Determining if a member contains opaque XML is straightforward because during the EdmGen process, the mapping between CSpace and the database is still one-to-one; for each member, its type is looked up on the store to see which XML schema collection it uses, if any.

The type of the strongly-typed CLR member is determined from its schema collection. If the collection has only one possible root element with XML type T, the member is given the CLR type corresponding to T. However, if there is more than one possible root, some additional logic is needed.

XML schema collections and schemas with multiple possible root elements are exactly like the XSD "choice" option, where elements with different names and potentially different types can hold the same position in a document. There are two distinct problems to deal with when developing mappings that accommodate choice, namely the type of the elements and the name of the elements Element name differences were described above. Types cause an issue in the CLR space, because for a member to be able to hold objects of more than one different type, there needs to be a common subclass or interface between them. Thus, if a choice allows member elements FieldA, FieldB, and FieldC, each of which are different, unrelated types, there are at least four options (a-d) for mapping to CLR objects:

a) Have three separate fields:
TypeA FieldA;
TypeB FieldB;
TypeC FieldC;

b) Subtype the parent type—have a new type that only has FieldA, another one that only has FieldB, and one more that only has FieldC. This approach becomes problematic if the enclosing type has more than one choice element, which could result in an exponentially-large number of subclasses to handle all combinations.

c) Create an empty interface that the needed types can implement it:
public interface MultipleRoots { }
public class TypeA: MultipleRoots { ... }
public class TypeB: MultipleRoots { ... }
public class TypeC: MultipleRoots { ... }
This approach has the advantage that, if the type appears in more than one choice element, it can implement as many interfaces as is necessary.

d) Implement option (a), but with the added restriction that only one of the fields may be filled at a time, and with an indicator to say which type it is:

```
public partial class TestMultipleRoots
{
    public enum Switch { TypeA, TypeB, TypeC }
    public Switch Type;
    private TypeA _fieldA;
    public TypeA FieldA
    {
        get
        {
            if (Type == Switch.TypeA)
            {
                return _fieldA;
            }
            else
            {
                throw new NotSupportedException("Object is not of
```

-continued

```
        specified type TypeA");
      }
    }
    set
    {
      _fieldA = value;
      Type = Switch.TypeA;
    }
  }
  ... and two more field/property combinations for B and C ...
}
```

In a version of the extended EdmGen, option (c) was chosen to generate an empty common interface if multiple different types can serve as the root node. If different root nodes of same type but different name are encountered, the code pattern described above is used. Whatever the root type or interface is becomes the type of the strongly-typed member in the sidecar file.

The mappings between classes and an XML schema can be generated using data contracts. Data Contracts are a new feature of Windows Communication Foundation (WCF), part of .Net 3.0. A data contract is an annotation of a CLR class definition that, among other things, tells WCF what the XML representation of an instance of the class should look like. In effect, a data contract implicitly creates an XML schema and mappings between that schema and the class.

Data contracts are supported in the situation shown in FIG. 8a, where the developer already has used EdmGen or some other tool to generate the relational portion of the metadata in the Entity Framework, and there are untyped XML columns on the store. Since those XML columns are untyped, EdmGen cannot leverage any XML schemas to generate an object surface.

Figure 8B:
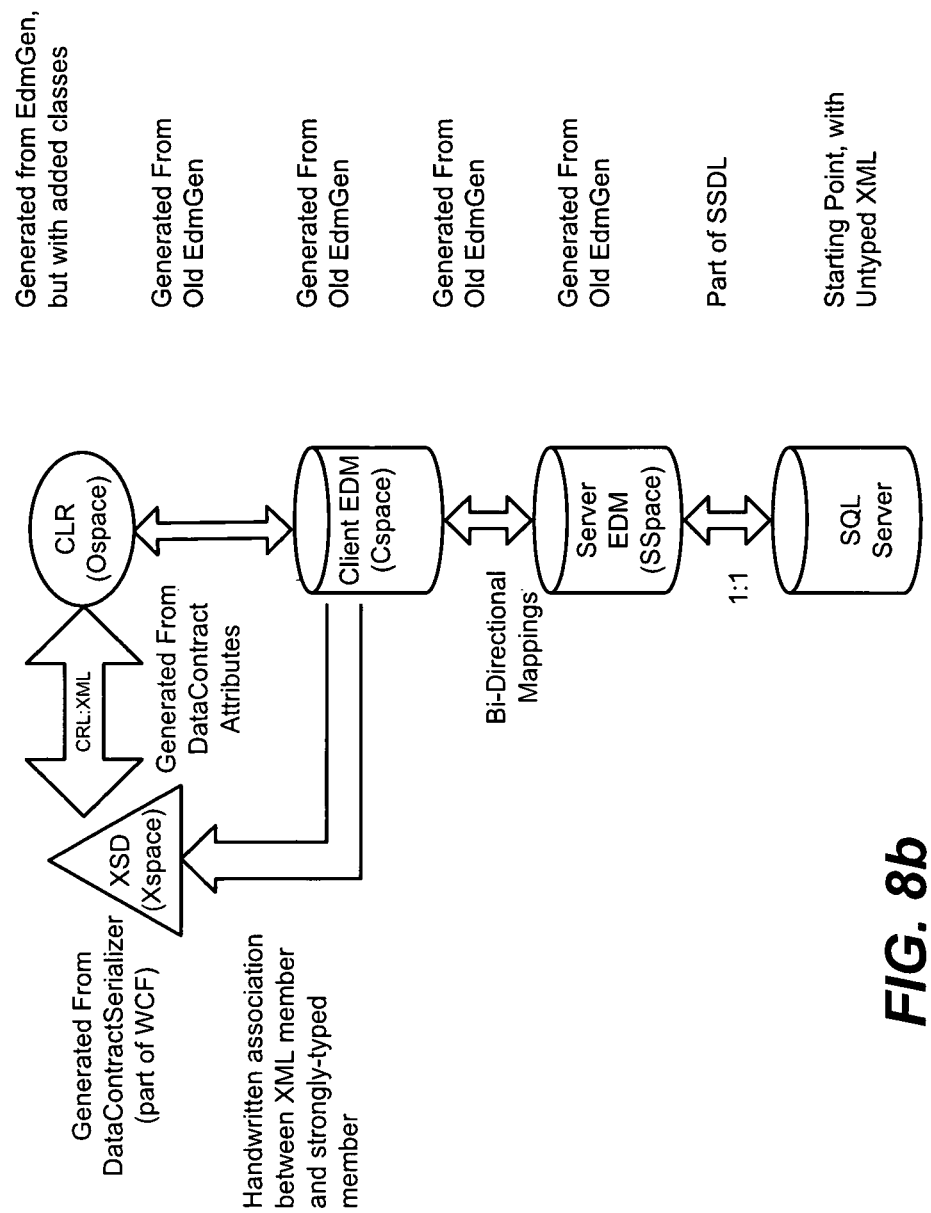
FIG. 8b is a representation of using data contracts to dynamically generate artifacts.
Figure 9:
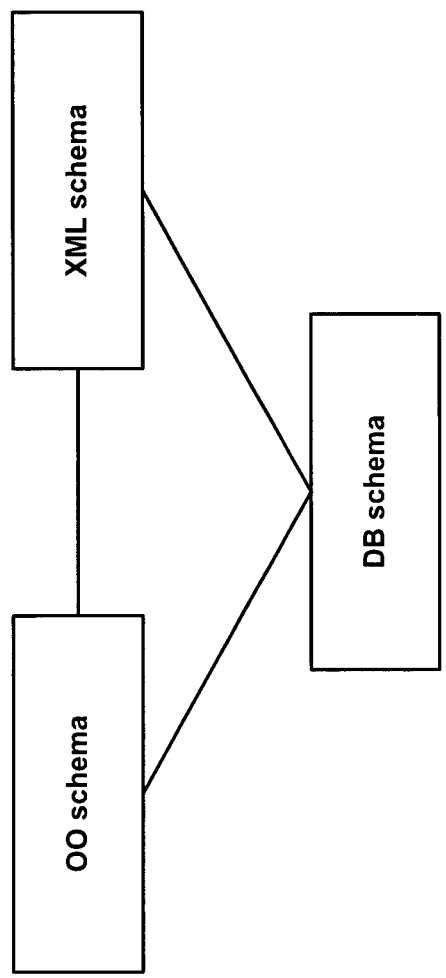
Figure 10A:
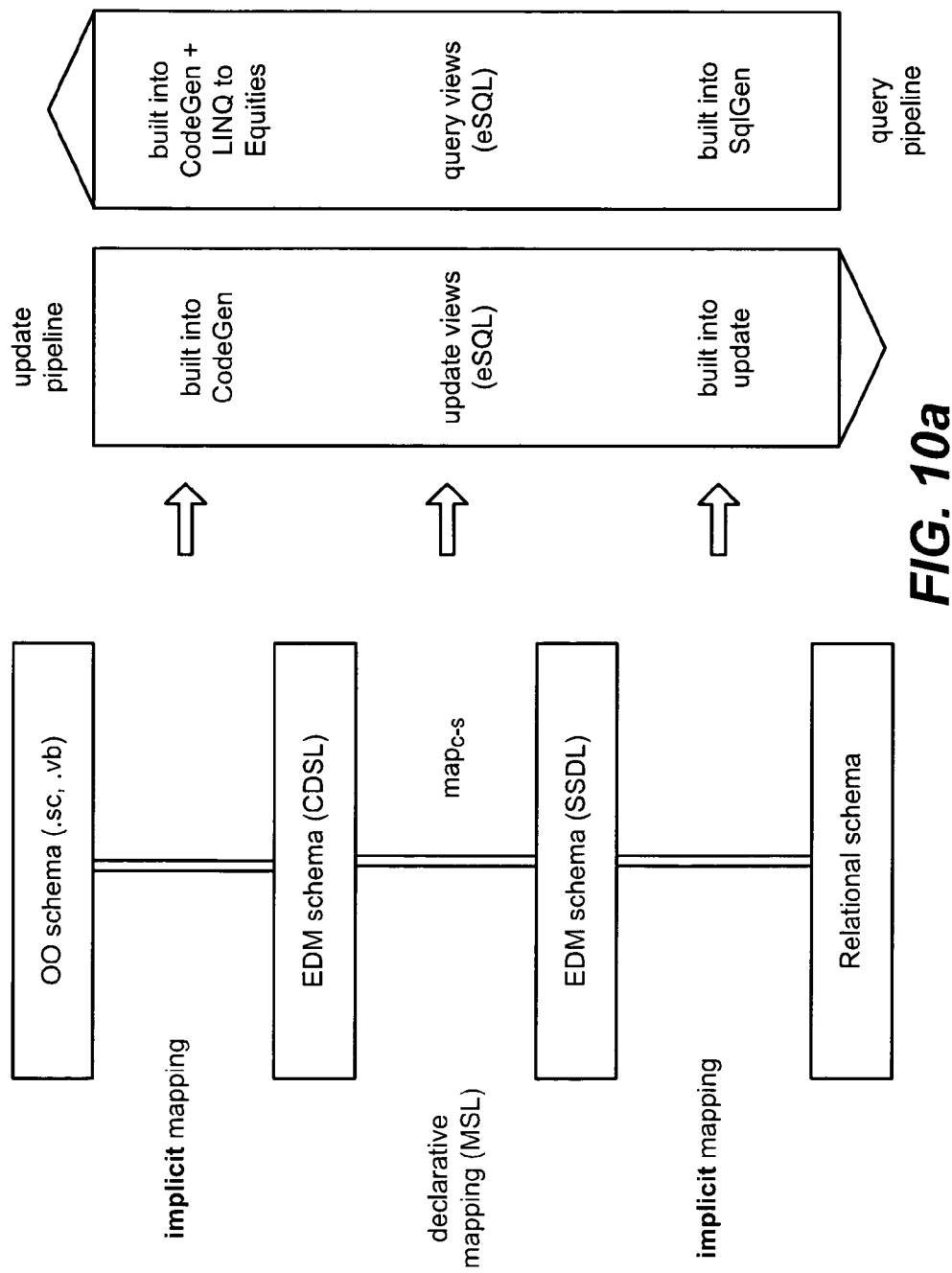
Figure 10B:
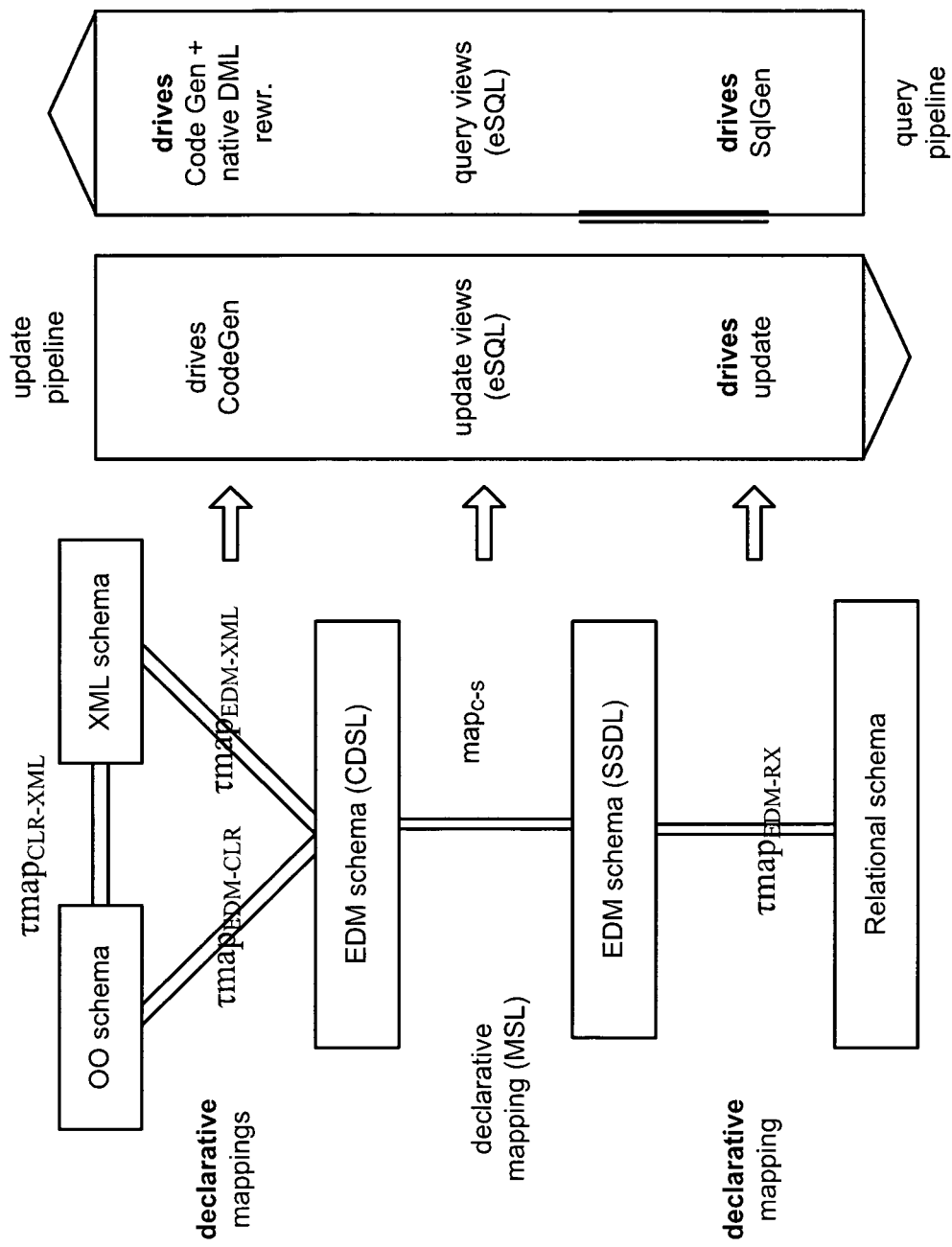
Figure 11:
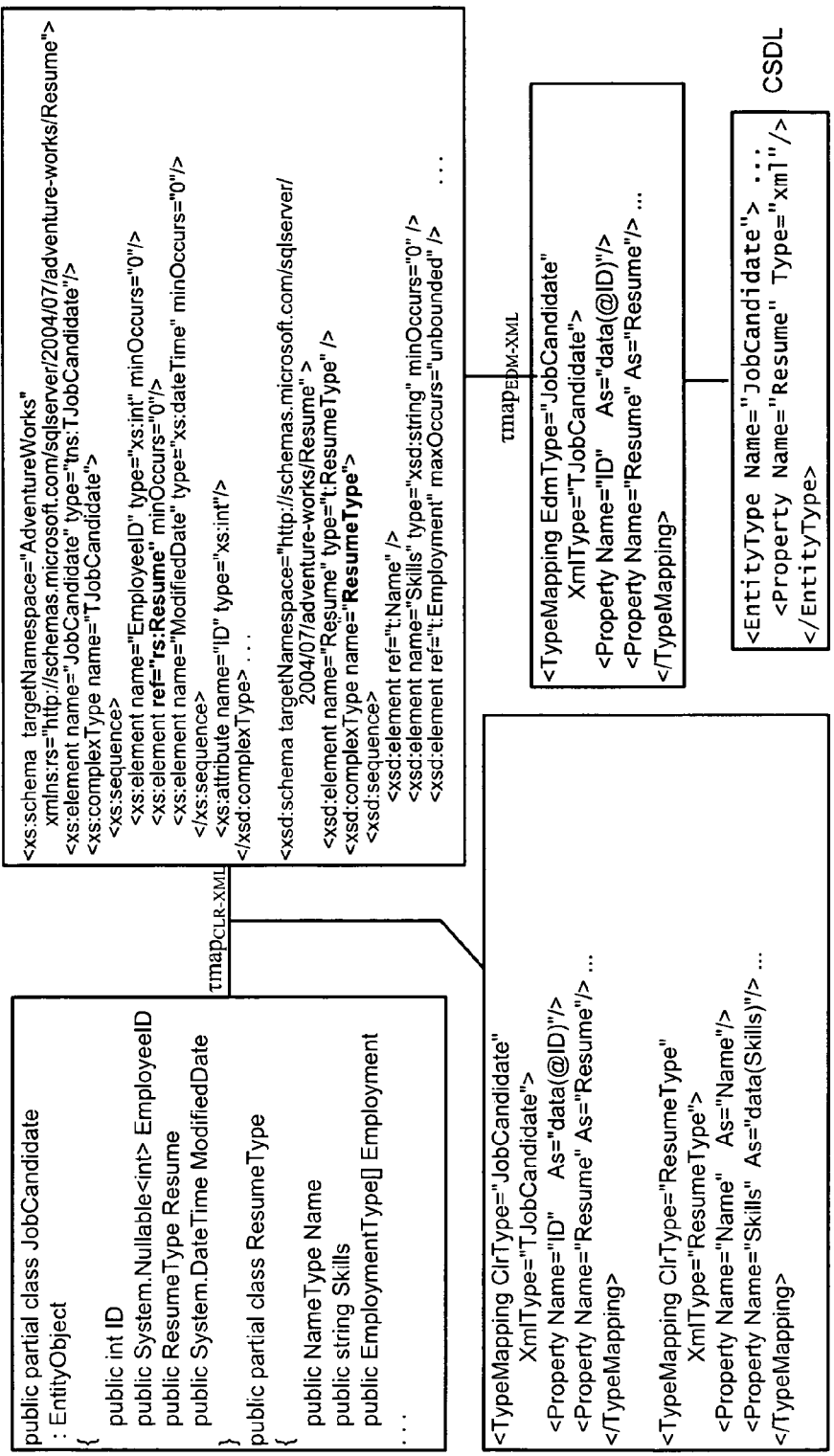

With the relational portion in place, the developer can add whatever object surface is desired, as long as each new class is marked with data contract attributes, and the relationship between the opaque XML column is associated with a strongly-typed member using an XmlMarshaled attribute. The XML schemas and mappings are generated on-the-fly at runtime (FIG. 8b).

Note that the needed XML schemas and CLR:XML mapping metadata may be materialized as files. This action would be useful because one could alter the class definitions, generate the new mapping metadata on the fly again, and compare it against the previous version to support some form of schema evolution.

One can specify a data contract by adding an attribute to a class or a member of a class:
  Add the DataContract attribute to a class that does not extend or implement a collection
  Add the CollectionDataContract attribute to a class that extends or implements a collection
  Add the DataMember attribute to a field or property of a non-collection class Contract attributes work like serialization attributes. Classes and members not marked with contract attributes are ignored and do not appear in the XML representation. The relationship between a CLR class and its XML representation through contracts is structurally static. The contract attributes have properties that allow the developer to change the names of elements, but the shape of the structure cannot be changed. For example, consider the following declaration:

```
[CollectionDataContract(Namespace = "CloudObjects", Name = "SalesAccountAlias", ItemName = "Alias", KeyName = "AccountID", ValueName = "SalesPerson")]
```

This declaration represents the maximum possible specification for the attribute. All of these properties demonstrate what the names of the XML elements should be, but do not control the shape of the XML. The shape of the XML can be described completely by the following rules:
  A non-collection type marked with a DataContract becomes an XML type, as well as a global element. The name of the element is the name of the class, unless overridden by DataContract properties.
  A member marked with a DataMember becomes a child element of the parent type definition. The name of the child element is the name of the member, unless overridden by DataMember properties.
  A non-scalar DataMember of one of the standard collection types (IEnumerable, List, Array) will still have a single child element. However, that element will itself have children that represent the elements in the collection. The name of the items defaults to the name of the XML type of the children.
  A non-scalar DataMember of one of the standard dictionary types (IDictionary, Hashtable, Dictionary) will also still have a single child element. However, that element will itself have children of name "KeyValueOfTypeATypeB" with TypeA and TypeB being the types of the key and value for the type. These elements will further have children marked as Key and Value.
  A DataMember that is a collection or dictionary, but whose type is a subclass of one of the standard types, must have that type marked with a CollectionDataContract. Child element names default to the same as the previous cases, unless overridden by contract properties.
  A collection or dictionary type marked with a CollectionDataContract becomes an XML type, as well as a global element. Rules for the global element and the collection children follow as previously mentioned. Any members of the new type that are marked with DataMember are ignored—the type is considered strictly as a collection or dictionary.
Note that the XML representation of a class will arrange its children in alphabetical order.

With these properties known, it is straightforward to create mappings because, for each class member, the exact path to the corresponding member in the XML type can be algorithmically determined.

FURTHER EXAMPLES

Turning to FIGS. 9-16, there are shown aspects of declarative mappings including mappings with formal semantics, support for data access and data services (queries, updates, bulk loading, messaging, replication, and so forth) and advanced scenarios and tools (e.g., extending EDMGen to produce XML mappings and supporting WCF's DataContract), An example XML Schema is set forth below:

```
<xs:element name="Employee" type="t:EmployeeType"/>
  <xs:complexType name="EmployeeType">
    <xs:sequence>
```

```
    <xs:element name="HRNote" type="xs:string" minOccurs="0" maxOccurs="unbounded"/>
    <xs:element name="EmployedAs" type="t:EmploymentType"/>
    <xs:choice>
      <xs:element name="DevTitle" type="xs:string"/>
      <xs:element name="PMTitle" type="xs:string"/>
    </xs:choice>
    <xs:element name="HRNote" type="xs:string" minOccurs="0" maxOccurs="unbounded"/>
    <xs:element name="CostCenter" type="t:CostCenterType" minOccurs="1" maxOccurs="2"/>
    <xs:any namespace="##other" processContents="lax" minOccurs="0" maxOccurs="unbounded"/>
  </xs:sequence>
  <xs:attribute name="Name" type="xs:string"/>
 </xs:complexType>
 <xs:complexType name="CostCenterType">
  <xs:attribute name="BusinessUnit" type="xs:string" use="required"/>
 </xs:complexType>
 <xs:simpleType name="EmploymentType" final="#all">
  <xs:restriction base="xs:string">
   <xs:enumeration value="FTE"/>
   <xs:enumeration value="Contractor"/>
  </xs:restriction>
 </xs:simpleType>
OBJECTS
public class EmployeeType
{
  public string Name;
  public string DevTitle;
  public string PMTitle;
  public string EmployedAs;
  public List<CostCenterType> CostCenters;
  public List<string> HRNote1;
  public List<string> HRNote2;
  public List<XElement> Other;
}
public class CostCenterType
{
  public string BusinessUnit;
}
public abstract class Employee
{
  public string Name;
  public string JobTitle;
  public Employment EmployedAs;
  public CostCenter PrimaryCostCenter;
  public CostCenter SecondaryCostCenter;
  public string[ ] EmploymentNote;
  public string[ ] CostCenterNote;
  protected XElement[ ] _Other;
}
public class CostCenter
{
  private string _BusinessUnit;
  public string BusinessUnit {
    get { return _BusinessUnit; }
    set { _BusinessUnit = value; }
  }
}
XO mapping for 1st
<TypeMapping ClrType="o.EmployeeType" XmlType="x:EmployeeType">
 <Property Name="Name"      As="data(@Name)"/>
 <Property Name="HRNote1"   As="data(x:HRNote[.<<../x:EmployedAs[1]])"/>
 <Property Name="EmployedAs" As="data(x:EmployedAs)"/>
 <Property Name="DevTitle"  As="data(x:DevTitle)"/>
 <Property Name="PMTitle"   As="data(x:PMTitle)"/>
 <Property Name="HRNote2"   As="data(x:HRNote[.>>../x:EmployedAs[1]])"/>
 <Property Name="CostCenters" As="x:CostCenter"/>
 <Property Name="Other"     As="*[.>>../x:CostCenter[last( )]]"/>
</TypeMapping>
<TypeMapping ClrType="o.CostCenterType" XmlType="x:CostCenterType">
 <Property Name="BusinessUnit" As="data(@BusinessUnit)"/>
</TypeMapping>
public class Developer
 : Employee { }
public class PM
 : Employee { }
public enum Employment
```

```
{
  FTE,
  Contractor
}
<TypeMapping ClrType="o.Developer" XmlType="x:EmployeeType">
  <Condition XPath="x:DevTitle"/>
  <Property Name="Name"              As="data(@Name)"/>
  <Property Name="EmploymentNote"    As="data(x:HRNote[.<<../x:EmployedAs[1]])"/>
  <Property Name="EmployedAs"        As="data(x:EmployedAs)"/>
  <Property Name="JobTitle"          As="data(x:DevTitle)"/>
  <Property Name="CostCenterNote"    As="data(x:HRNote[.>>../x:EmployedAs[1]])"/>
  <Property Name="PrimaryCostCenter"   As="x:CostCenter[1]"/>
  <Property Name="SecondaryCostCenter" As="x:CostCenter[2]"/>
  <Property Name="__Other"           As="*[.>>../x:CostCenter[last( )]]"/>
</TypeMapping>
<TypeMapping ClrType="o.PM" XmlType="x:EmployeeType">
  <Condition XPath="x:PMTitle"/>
  ...
  <Property Name="JobTitle"          As="data(x:PMTitle)"/>
  ...
</TypeMapping>
<TypeMapping ClrType="o.CostCenter" XmlType="x:CostCenterType">
  <Property Name="BusinessUnit"   As="data(@BusinessUnit)"/>
</TypeMapping>
```

The formal semantics of a CLR:XML mapping is stated in terms of a binary relation between CLR and XDM value spaces:

```
For all x of type EmployeeType, $y of type element(*, EmployeeType):
τmap(x, $y) ⇔
    x.Name = data($y/@Name)                                        and
    list-τmap(x.HRNote1, data(HRNote[.<<../EmployedAs[1]]))        and
    x.EmployedAs = data($y/x:EmployedAs)                           and
    x.DevTitle = data($y/x:DevTitle)                               and
    x.PMTitle = data($y/x:PMTitle)                                 and
    list-τmap(x.HRNote2, data(x:HRNote[.>>../x:EmployedAs[1]]))    and
    list-τmap(x.CostCenters, $y/x:CostCenter)                      and
    fn:deep-equal(x.Other, *[.>>../x:CostCenter[last( )]])
For all x of type CostCenterType, $y of type element(*, CostCenterType):
τmap(x, $y) ⇔
         x.BusinessUnit = data($y/BusinessUnit)
Macro: list-τmap(xs, ys) ⇔ ∀i (τmap(xs[i],ys[i]))
```

Figure 12:
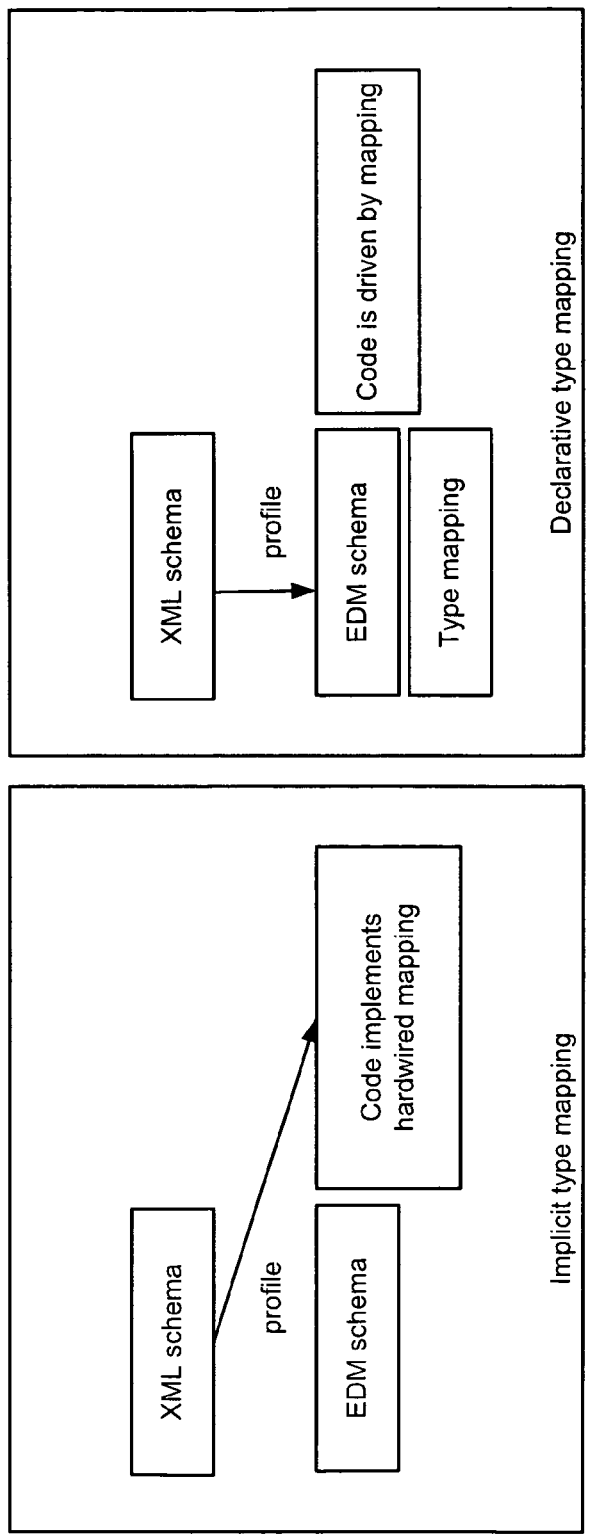

FIG. 12 illustrates mapping versus profile concepts, namely a mapping profile (for two schema definition languages) comprising an algorithm for translating schemas and type mapping (implicit/hardwired in code), and type mapping (between two specific schemas), comprising an explicit, declarative mapping specification, which can be user-defined or generated by applying a profile.

The following provides an example XML Schema (for Application or Database):

```
<xs:complexType name="XSDfoo">
    <xs:sequence>
        <xs:element name="a" minOccurs="0"
            maxOccurs="unbounded"/>
        <xs:element name="b" type="xs:integer"/>
        <xs:any namespace="##other" maxOccurs="5"/>
        <xs:sequence minOccurs="2" maxOccurs="2">
            <xs:element name="c"/>
        </xs:sequence>
        <xs:choice>
            <xs:element name="c"/>
            <xs:element name="d" type="XSDbar"/>
        </xs:choice>
        <xs:element name="a" minOccurs="0"
            maxOccurs="unbounded"/>
    </xs:sequence>
    <xs:attribute name="t"/>
</xs:complexType>
<xs:complexType name="XSDbar">
    <xs:sequence>
        <xs:element name="g"/>
    </xs:sequence>
</xs:complexType>
```

The following provides an example EDM Schema:

```
<EntityType Name="EDMfoo">
    <Property Name="t" Type="String"/>
    <Property Name="a1" Type="Collection(String)"/>
    <Property Name="a2" Type="Collection(String)"/>
    <Property Name="b" Type="Int32"/>
    <Property Name="c12" Type="Collection(Int32)"/>
    <Property Name="c3" Type="Int32"/>
    <Property Name="d" Type="EDMbar"/>
    <Property Name="any" Type="xml"/>
</EntityType>
<ComplexType name="EDMbar">
    <Property name="g" type="String"/>
</ComplexType>
```

The following shows EDM to XML Type Mapping:

```
<!DOCTYPE foo [
<!ENTITY before ".<<../">
<!ENTITY after ".>>../">
]
<TypeMapping EDMType="EDMfoo" XSDType="XSDfoo"
Language="XPath">
  <Property Name="t"    As="data(@t)"/>
  <Property Name="a1"   As="data(a[&before;b[1]])"/>
  <Property Name="a2"   As="data(a[&after;b[1]])"/>
  <Property Name="b"    As="data(b)"/>
  <Property Name="c12"  As="data(c[position( ) < 3])"/>
  <Property Name="c3"   As="data(c[3])"/>
  <Property Name="d"    As="d"/>
  <Property Name="any"  As="*[&after;b[1] and &before;c[1]]"/>
</TypeMapping>
<TypeMapping EDMType="EDMbar" XSDType="XSDbar"
Language="XPath">
  <Property Name="g"    As="data(g)"/>
</TypeMapping>
SEMANTICS: XDM = XQuery / XPath Data Model:
```

-continued

```
Type mapping = binary relation on value spaces
Intuition: if τmap(x, $y) then
       x is EDM-surrogate for $y, $y is XML-surrogate for x
EDM/XML type mapping is a relation
τmap_{EDM-XML} ⊆ Val_{EDM} × val_{XDM}
Specification: similar to regular mappings
       Query on x = Query on $y
τmap_{EDM-XML}
   For all x IS OF EDMfoo, $y instance of element(*, XSDfoo):
   τmap(x, $y) ⇔
       x.t = data($y/@t)                                   and
       set-τmap(x.a1, data($y/a[.<<../b[1]]))              and
       set-τmap(x.a2, data($y/a[.>>../b[1]]))              and
       x.b = data($y/b)                                    and
       set-τmap(x.c12, data($y/c[position( ) < 3]))        and
       x.c3 = data($y/c[3])                                and
       τmap(x.d, $y/d)                                     and
       fn:deep-equal(x.any, $y/*[.>>../b[1] and .<<../c[1]])
   For all x IS OF EDMbar, $y instance of element(*, XSDbar):
   τmap(x, $y) ⇔
       x.g = data($y/g)
set-τmap(xs, ys) ⇔ ∀x∈xs ∃y∈ys (τmap(x,y)) and
       ∀y∈ys ∃x∈xs (τmap(x,y))
```

For scalar Type Mapping:

```
Regular data type mapping plus special values
τmap is 1:1 on val_{Int32}×val_{xs:int}, etc.
    For simplicity, assuming val_{Int32}=val_{xs:int}, etc.
τmap(NULL, ( )) where ( ) is empty sequence
τmap(NULL, $e) where $e instance of element( ) and $e/@xsi:nil=true( )
```

Instances are exemplified in FIG. 13. With respect to lossless type mappings:

```
Given
    x_1 IS OF EDMfoo, $y_1 instance of element(*, XSDfoo),
    τmap(x_1, $y_1)
    x_2 IS OF EDMfoo, $y_2 instance of element(*, XSDfoo),
    τmap(x_2, $y_2)
    =_{EDM} is standard value equality in EDM
    =_{XSD} (eq-XSD below): XML fragments isomorphic up to root name
EDMfoo captures XSDfoo: ∀x_1 x_2 y_1 y_2 (x_1 =_{EDM} x_2 ⇒ y_1 =_{XSD} y_2)
XSDfoo captures EDMfoo: ∀x_1 x_2 y_1 y_2 (y_1 =_{XSD} y_2 ⇒ x_1 =_{EDM} x_2)
EDMfoo is equivalent to XSDfoo: capture each other
declare function local:eq-XSD($x as element( ), $y as element( )) as
xs:boolean {
    local:set-eq($x/attribute::*, $y/attribute::*) and
    fn:deep-equal($x/child::node( ), $y/child::node( ))
};
declare function local:set-eq($xa as item( )*, $ya as item( )*) as
xs:boolean {
    (every $i in $xa satisfies (some $j in $ya satisfies $i = $j)) and
    (every $j in $ya satisfies (some $i in $xa satisfies $i = $j))
};
```

Figure 14:
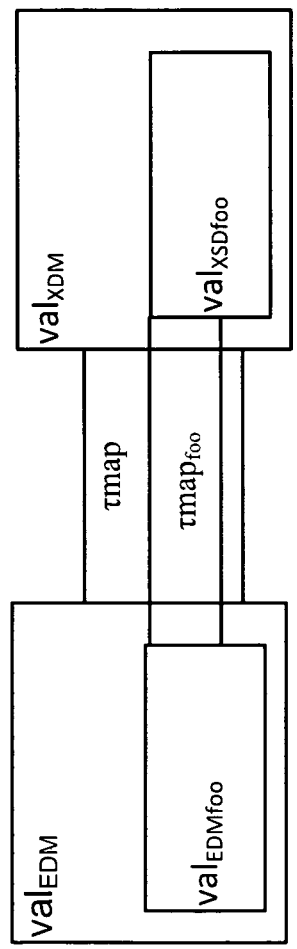
Figure 15:
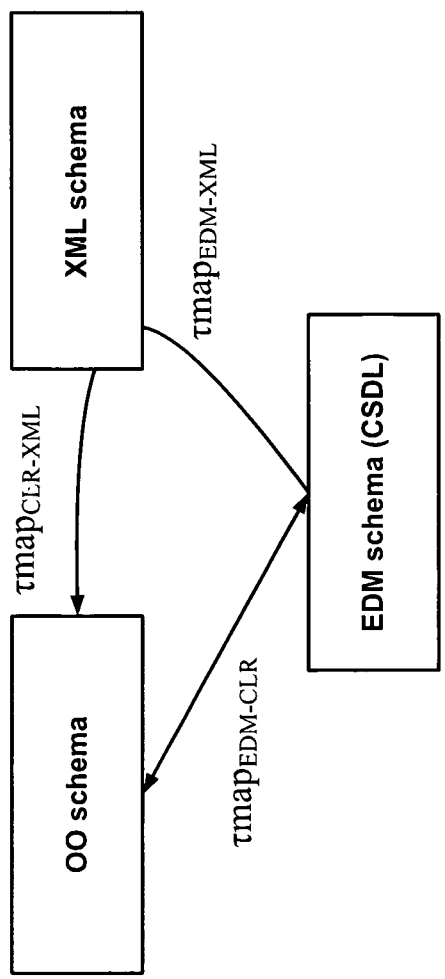
Figure 16:
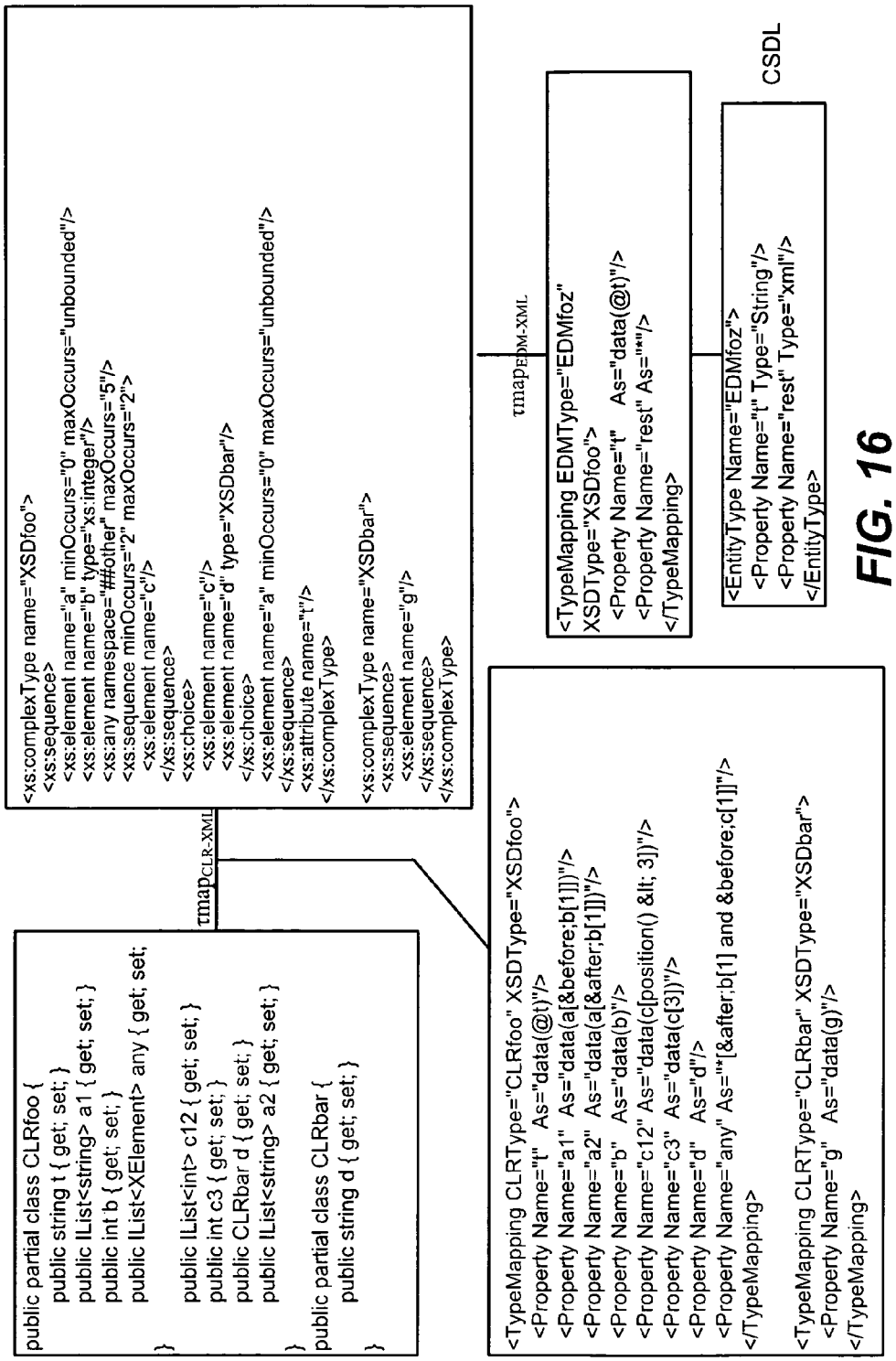
Figure 17:
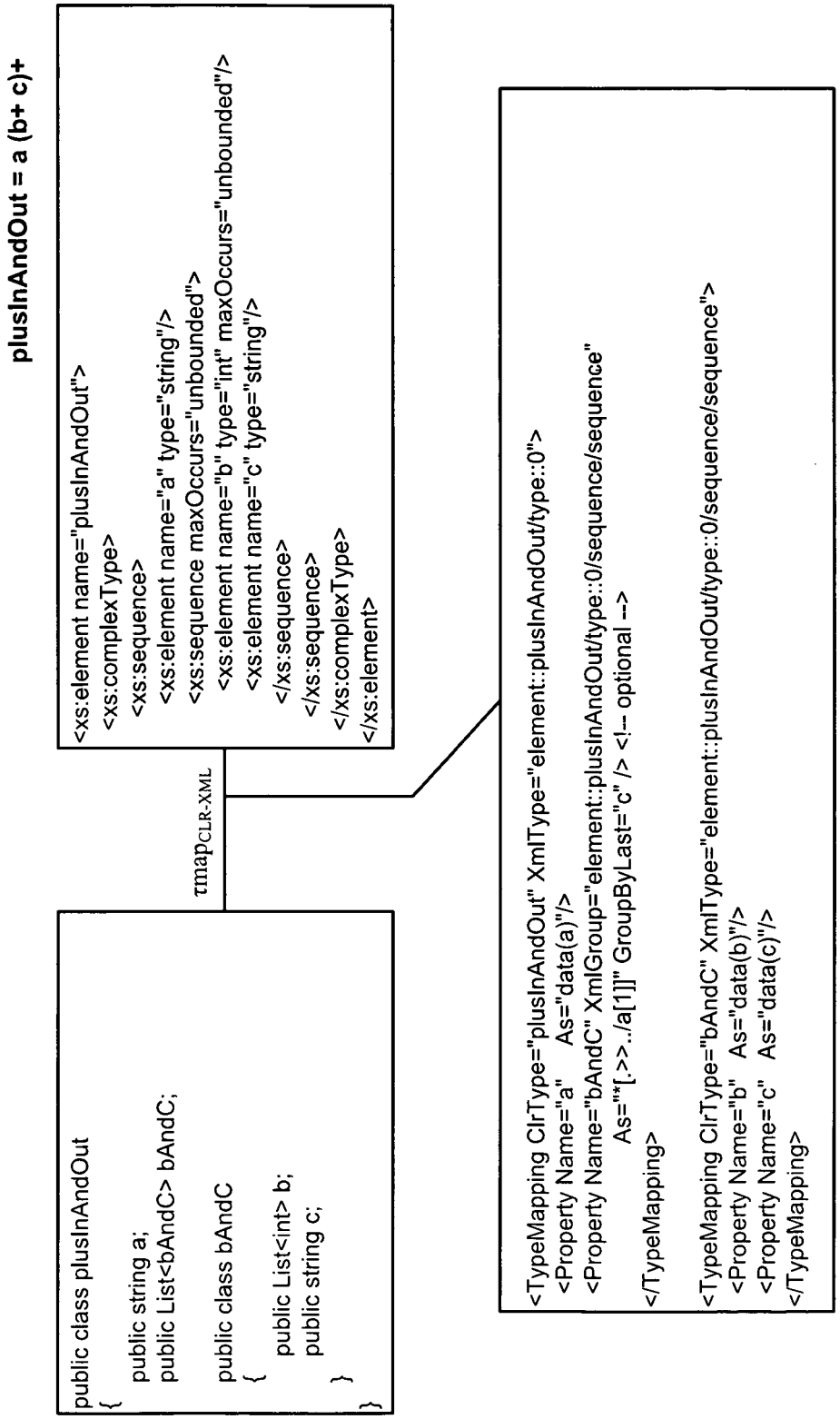
FIG. 17 is a representation showing grouping aspects of mapping.
Figure 18:
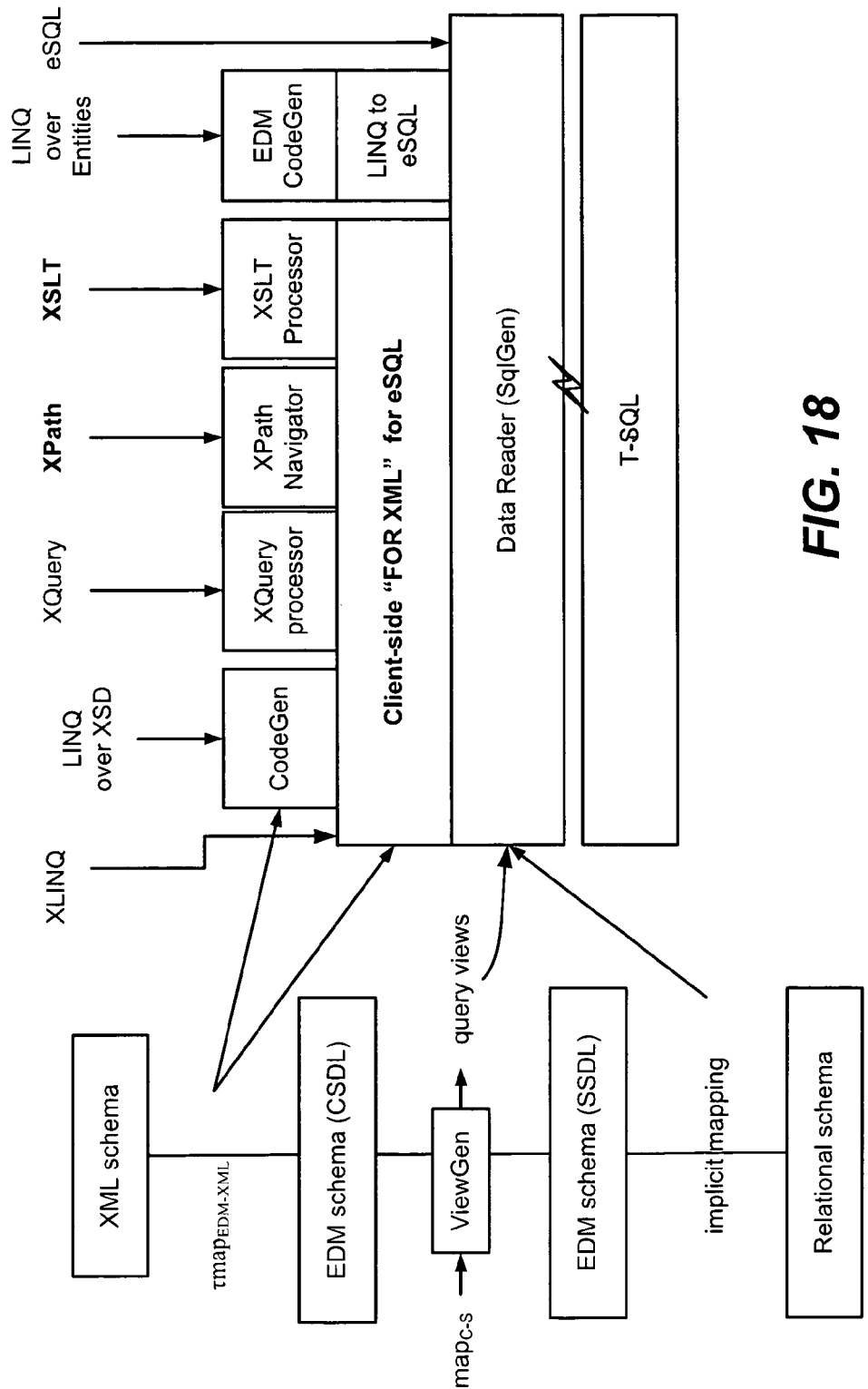
FIGS. 18-21 are block diagrams showing various components used in mapping.
Figure 19:
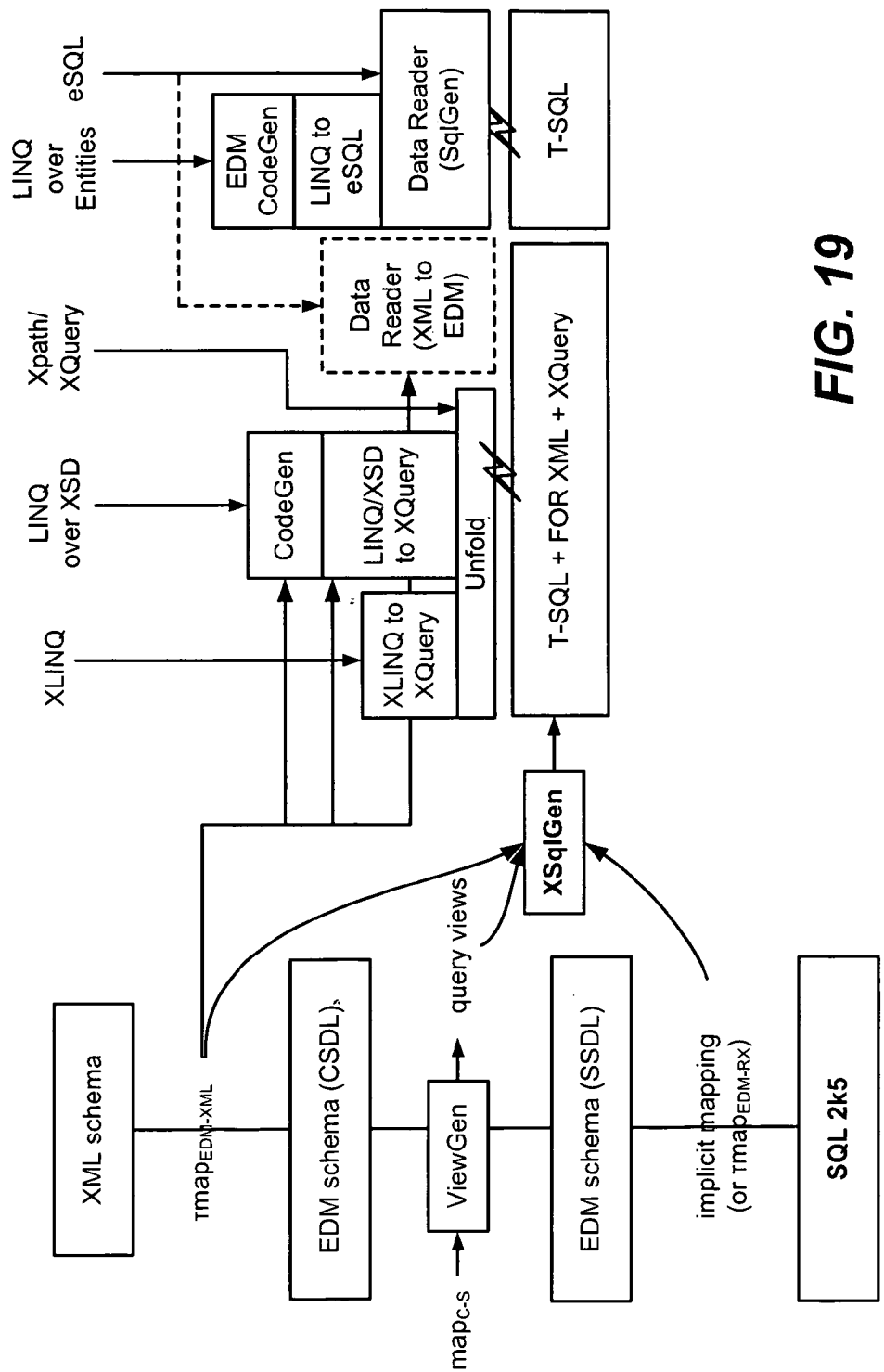
Figure 20:
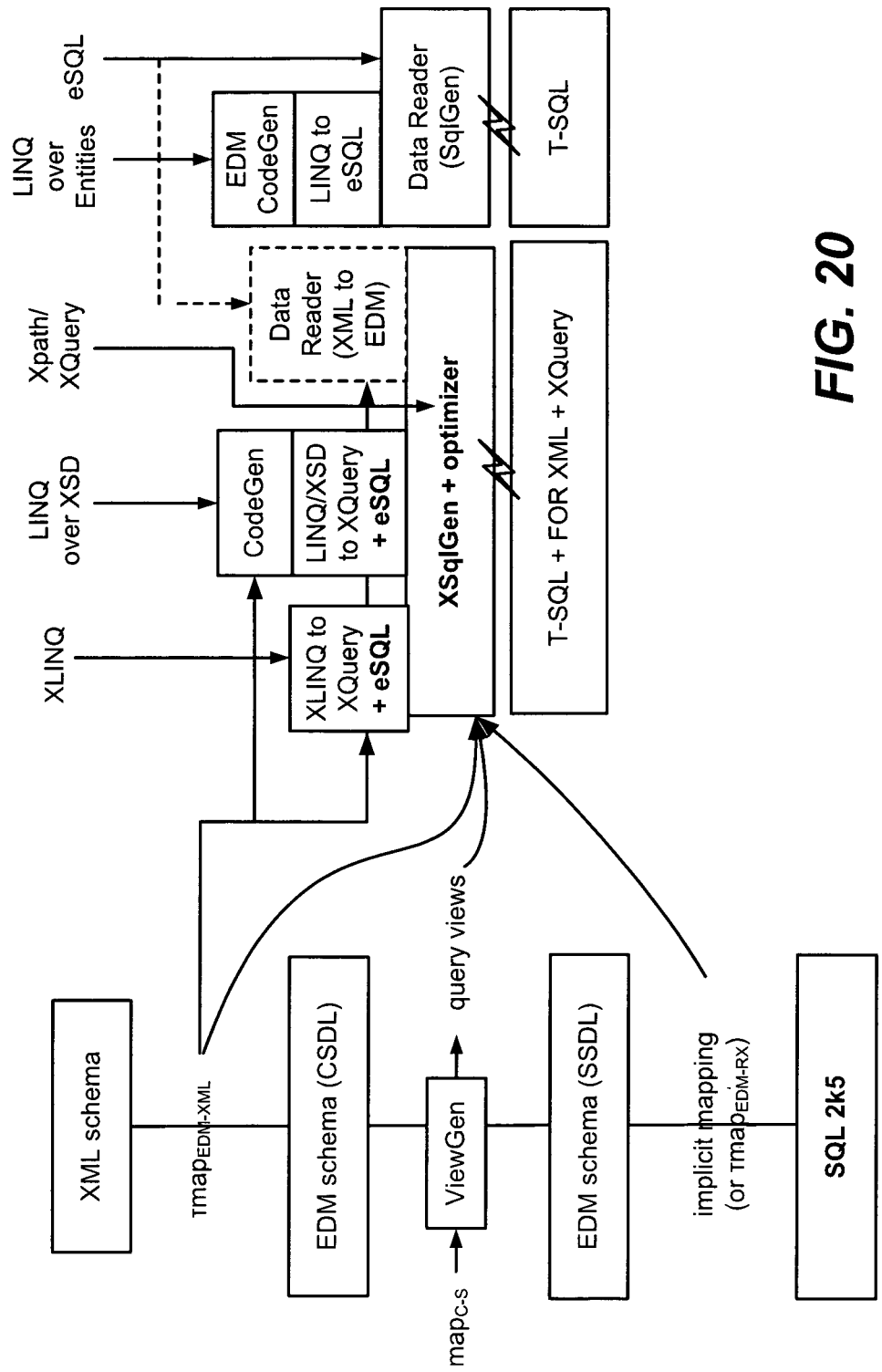
Figure 21:
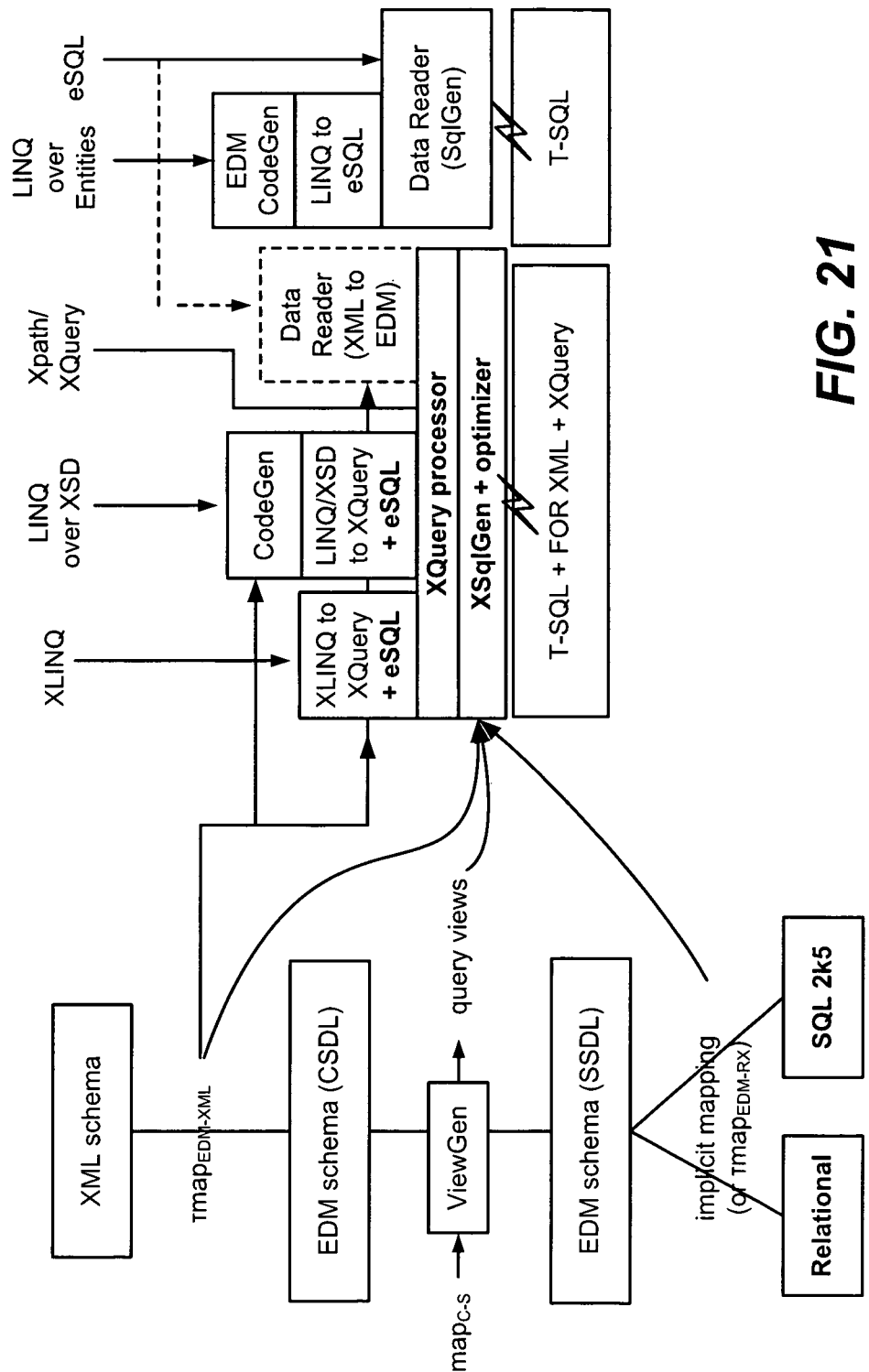

Roundtripping of Value Spaces is represented in FIG. 14:

```
Let val_{XSDfoo} denote the value space of XSDfoo
    val_{XSDfoo} = { ($y/attribute::*, $y/child::node( )) | $y instance of
                                                 element(*, XSDfoo)
    }
    I.e., val_{XSDfoo} = set of equivalence classes of =_{XSD} on
    val_{element(*, XSDfoo)}
Let τmap_{foo} = τmap ∩ (val_{EDMfoo} × val_{XSDfoo})
EDMfoo captures XSDfoo ⇔ τmap_{foo}^{-1} · τmap_{foo} = Id(val_{XSDfoo})
XSDfoo captures EDMfoo ⇔ τmap_{foo} · τmap_{foo}^{-1} = Id(val_{EDMfoo})
EDMfoo is equivalent to XSDfoo ⇔ τmap_{foo} is a 1:1 function
```

With respect to XPath Type Mappings, desirable properties of XPath expressions include:

Child and attribute axis only, single step
No gaps: consecutive sequence of nodes
Disjointness: no overlapping nodes
Ordering: nodes from one XPath expr precede those from another XPath expr (implied by No gaps and Disjointness)

If these properties hold, XML to EDM and EDM to XML transformations are straightforward; XPath type mappings are not tied to XML Schema (and thus works for other XML schema languages).

XML to EDM example:

```
Given: x IS OF EDMfoo, $y instance of element(*, XSDfoo), τmap(x, $y)
Query: SELECT x.*
Rewriting:
SELECT
    @y.value('data(*/@t)[1]', 'nvarchar(max)') AS t,
    @y.query('data(*/a[.<<../b[1]])')         AS a1,
    @y.query('data(*/a[.>>../b[1]])')         AS a2,
    @y.value('data(*/b)[1]', 'int')           AS b,
    @y.query('data(*/c[position( ) < 3])')    AS c12,
    @y.value('data(*/c[3])[1]', 'int')        AS c3,
    @y.query('*/d')                           AS d,
    @y.query('*/*[.>>../b[1] and .<<../c[1]]') AS any
DECLARE @y xml
SET @y = '
<value t="foo">
    <a>first1</a>
    <a>first2</a>
    <b>5</b>
    <any1/>
    <any2/>
    <any3/>
    <c>1</c>
    <c>2</c>
    <d>
        <g>baz</g>
    </d>
    <a>second</a>
</value>'
```

Equivalences for EDM to XML Rewriting:

```
The following conditions are equivalent
    x.t = data($y/@t) ⇔
        fn:deep-equal( attribute "t" { x.t }, $y/@t )
    set-τmap(x.a1, data($y/a[.<<../b[1]])) ⇔
        fn:deep-equal( tag("a", x.a1), $y/a[.<<../b[1]] )
declare function tag($n as xs:string,
        $e as item( )*) as element( )*
{
    for $i in $e
    return element { xs:QName($n) } { $i }
};
Rewriting of XML Queries
Given: x IS OF EDMfoo, $y instance of element(*, XSDfoo), τmap(x, $y)
Query: $q := $y/a
Rewriting: $y/a == ($y/a[.<<../b[1]],
        $y/a[.>>../b[1]])
        == (tag("a", x.a1),
        tag("a", x.a2))
Shortcut: $y == $z ⇔ fn:deep-equal($y, $z)
Rewriting of XML Identity Query
Given: x IS OF EDMfoo, $y instance of element(*, XSDfoo), τmap(x, $y)
Query: toXML($y) := ($y/attribute::*, $y/child::node( ))
Rewriting: toXML($y) ==
( attribute t { data($y/@t) },
    tag("a", data($y/a[.<<../b[1]])),
    <b>{ data($y/b) }</b>,
    $y/*[.>>../b[1] and .<<../c[1]],
    tag("c", data($y/c[position( ) < 3])),
    <c>{ data($y/c[3]) }</c>,
    <d>{ toXML($y/d) }</d>,
    tag("a", data($y/a[.>>../b[1]]))
)
```

```
==
( attribute t { x.t },
  tag("a", x.a1),
  <b>{ x.b }</b>,
  x.any,
  tag("c", x.c12),
  <c>{ x.c3 }</c>,
  <d>{ toXML(x.d) }</d>,
  tag("a", x.a2)
)
EDM → XML
XQuery:
<result> {
( attribute t { x.t },
  tag("a", x.a1),
  <b> { x.b } </b>,
  x.any,
  tag("c", x.c12),
  <c> { x.c3 } </c>,
  <d> {
     ( attribute g { x.d.g } )
  } </d>,
  tag("a", x.a2)
) } </result>
T-SQL + FOR XML:
SELECT
  x.t AS '@t',
  (SELECT i AS 'a' FROM x.a1 AS a1(i)
        FOR XML PATH(''), TYPE) AS '*',
  x.b AS 'b',
  x.any AS '*',
  (SELECT i AS 'c' FROM x.c12 AS c12(i)
        FOR XML PATH(''), TYPE) AS '*',
  x.c3 AS 'c',
  (SELECT x.d.g AS 'g' FOR XML PATH('d'), TYPE) AS '*',
  (SELECT i AS 'a' FROM x.a2 AS a2(i)
        FOR XML PATH(''), TYPE) AS '*'
FOR XML PATH('result'), TYPE
```

CLR Type Mapping—used in Object Services, CodeGen, and LINQ over Entities—example:

```
public partial class CLRfoo {
    public string t { get; set; }
    public lList<string> a1 { get; set; }
    public int b { get; set; }
    public lList<XElement> any { get; set; }
    public lList<int> c12 { get; set; }
    public int c3 { get; set; }
    public CLRbar d { get; set; }
    public lList<string> a2 { get; set; }
}
public partial class CLRbar {
    public string d { get; set; }
}
            CLR type mapping is a relation
τmap_{EDM-CLR} ⊆ Val_{EDM} × val_{CLR}
τmap_{EDM-CLR}
        For all x IS OF EDMfoo, y is CLRfoo:
        τmap(x, y)⇔
            x.t = y.t                    and
            set-τmap(x.a1, y.a1)         and
            set-τmap(x.a2, y.a2)         and
            x.b = y.b                    and
            set-τmap(x.c12, y.c12)       and
            x.c3 = y.c3                  and
            τmap(x.d, y.d)               and
            fn:deep-equal(x.any, y.any)
        For all x IS OF EDMbar, y is CLRbar:
        τmap(x, y)⇔
            x.g = y.g
```

CLR:XML Type Mapping example: Used in LINQ over XSD. Note that in FIG. 2a5, the Asymmetry is due to the fact that every XSD type can be mapped to the EDM xml type. CLR type mapping is a relation:

$$\tau map_{CLR:XML} \subseteq val_{CLR} \times val_{XDM}$$

A CLR type can be mapped to an EDM type either directly or by composition via CLR:XML:

$$\tau map_{CLR:XML}$$

This preserves element order in lists

Figure 7:
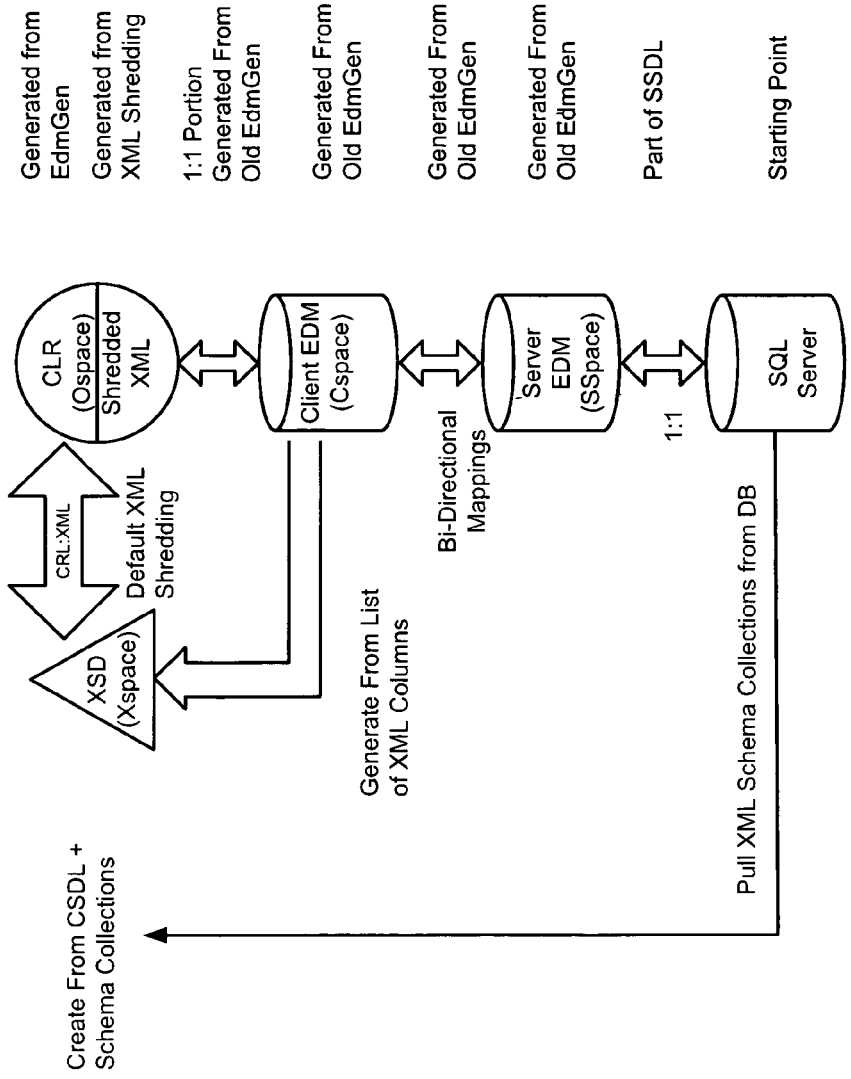
FIG. 7 representation of generating runtime-to-XML mappings.

```
For all x IS OF CLRfoo, $y instance of element(*, XSDfoo):
τmap(x, $y)⇔
    x.t = data($y/@t)                               and
    list-τmap(x.a1, data($y/a[.<<../b[1]]))         and
    list-τmap(x.a2, data($y/a[.>>../b[1]]))         and
    x.b = data($y/b)                                and
    list-τmap(x.c12, data($y/c[position( ) < 3]))   and
    x.c3 = data($y/c[3])                            and
    τmap(x.d, $y/d)                                 and
    fn:deep-equal(x.any, $y/*[.>>../b[1] and .<<../c[1]])
For all x IS OF CLRbar, $y instance of element(*, XSDbar):
τmap(x, $y)⇔
    x.g = data($y/g)
list-τmap(xs, ys)⇔ ∀i (τmap(xs[i],ys[i]))
```

τmap_{EDM-CLR} by composition is represented in FIG. 2a6, and grouping in FIG. 2a7.

```
Grouping semantics (plusInAndOut = a (b+ c)+)
-- GROUP p BY FIRST g
SELECT @xml.query('p').query('
    for $i in g, $j in g[.>>$i][1]
    return <group>{ $i, *[.>>$i and .<<$j] }</group> ,
    for $i in g[last( )]
    return <group>{ $i, *[.>>$i] }</group>')
-- GROUP p BY LAST g
SELECT @xml.query('p').query('
    for $i in g[1]
    return <group>{ *[.<<$i], $i }</group> ,
    for $i in g, $j in g[.>>$i][1]
    return <group>{ *[.>>$i and .<<$j], $j }</group>')
```

Relational Type Mapping (SSDL) (Note '/ns:resume' is the root element in the XML schema)

```
<TypeMapping EDMType="EDMJobCandidate"
    RelationalType=
    "[AdventureWorks].[HumanResources].[JobCandidate]"
    Language="T-SQL">
    <Property Name="JobCandidateID" As="JobCandidateID"/>
    <Property Name="EmployeeID"    As="EmployeeID"/>
    <Property Name="Resume"        As="Resume.query('/ns:Resume')"/>
    <Property Name="ModifiedDate"  As="ModifiedDate"/>
</TypeMapping>
<TypeMapping EDMType="EDMResume" XSDType="ns:ResumeType"
    Language="XPath">
    <Property Name="Name"       As="data(Name)"/>
    <Property Name="Employment" As="Employment"/>
    ...
</TypeMapping>
```

Type Mapping is a Relation

```
τmap_{EDM-RX} ⊆ val_{EDM} × (val_{XDM} ∪ val_{Rel})
    Used in SqlGen:
    τmap_{EDM-RX} (Just as τmapEDM-XML )
        For all x IS OF EDMJobCandidate, y AS [JobCandidate]
        τmap(x, y)⇔
            x.JobCandidateID = y.JobCandidateID                  and
            x.EmployeeID = y.EmployeeID                          and
            τmap(x.Resume, y.Resume.query('/ns:Resume'))         and
```

```
        x.ModifiedDate = y.ModifiedDate
    For all x IS OF EDMResume, $y instance of
    element(*, ns:ResumeType):
    τmap(x, $y)⇔
        x.Name = data($y/Name)
        set-τmap(x.Employment, $y/Employment)
        ...
```

Types, Extents, and Schemas:

```
Pow(V) = { S | S ⊆ V }
    Extents: EntitySet<Person>, Person(ID, Name), class Person,
        root element(person, PersonType)
    Extent can be viewed as a "powerset type"
            val_{EntitySet<Person>} = Pow(val_{person})
                value = set of Person entities
            val_{Person(ID, Name)} = Pow(val_{row(ID, Name)})
                value = set of rows
            val_{class Person} = Pow(val_{type Person})
                value = set of Person objects
            val_{person} = Pow(Val_{element(person, PersonType)})
                value = set of element(person, PersonType) fragments
```

EDM container/DB schema is a "row type of extents".

```
val_{{EntitySet<Person>, EntitySet<Order>}} = Val_{EntitySet<Person>} ×
    Val_{EntitySet<Order>}
Type mapping for extents = schema mapping (relation on DB states)
```

EDM-XML Extent Mapping

```
<ExtentMapping EDMExtent="EDMPeople" XSDExtent="ns:person"/>
    τmap_{EDM-XML}(EDMPeople, ns:person)⇔
        set-τmap_{EDM-XML}(SELECT * FROM EDMPeople, /ns:person)
<ExtentMapping EDMExtent="EDMPeople" CLRExtent="ns.Person"/>
    τmap_{EDM-CLR}(EDMPeople, ns.Person)⇔
        set-τmap_{EDM-CLR}(SELECT * FROM EDMPeople,
            instances of ns.Person)
<ExtentMapping CLRExtent="ns.Person" XSDExtent="ns:person"/>
    τmap_{CLR-XML}(ns.Person, ns:person)⇔
        set-τmap_{CLR-XML}(instances of ns.Person, /ns:person)
```

Hybrid Type System; τmap defines how class implements interface

```
        val_{XSDfoo} ⊆ val_{EDMfoo}
        for all x ∈ val_{EDMfoo}:
            τmap(x, x)
        interface EDMfoo
        interface EDMbar
        abstract class element(*, XSDfoo) : EDMfoo
        abstract class element(*, XSDbar) : EDMbar
        class element(a, XSDfoo) : element(*, XSDfoo)
        ...
        let $y :=
        <value t="foo">
            <a>first1</a>
            <a>first2</a>
            <b>5</b>
            <any1/>
            <any2/>
            <any3/>
            <c>1</c>
            <c>2</c>
            <d>
                <g>baz</g>
```

```
            </d>
            <a>second</a>
        </value>
``` is an instance of element(*, XSDfoo); Hence, it is an instance of EDMfoo

```
        $y/d =
        <d>
            <g>baz</g>
        </d>
``` is an instance of element(*, XSDbar). Hence, it is an instance of EDMbar. So, it can be assigned to x.d.

```
        <bla
            xsi:type="XSDbar">
            <g>baz</g>
        </bla>
        can also be assigned to x.d
```

Example XML Stages are shown in FIGS. 18-21.

What is claimed is:

1. In a computing environment, a method comprising:
    declaring a condition, wherein the condition comprises a name and a value;
    providing a mapping between object classes and XML, the mapping comprising the condition defined as a condition element in a markup language, wherein the name and the value are attributes of the condition element, wherein the mapping between object classes and XML classes is capable of mapping scalar type properties, complex type properties, and collection type properties; and
    upon satisfying the condition defined by the name and value, using the mapping to allow programming against a database having a plurality of data sets, the plurality of data sets comprising a first set of relational data and a second set of XML data, wherein a first set of one or more object classes are mapped to at least the first set of relational data and a second set of one or more object classes are mapped to at least the second set of XML data, wherein the mapping allows programming against both the first set of one or more object classes and the second set of one or more object classes using a single language integrated query feature for programming at least one query; and
    translating the at least one query into at least a first query language for providing access to the first set of relational data and a second query language for providing access to the second set of XML data.

2. The method of claim 1, wherein providing the mapping comprises providing explicit declarative mappings that are expressed using a data manipulation language.

3. The method of claim 1, wherein providing the mapping comprises supporting strongly-typed classes and loosely-typed classes.

4. The method of claim 1, wherein using the mapping comprises receiving a query, and translating the query into another query that combines access to relational data and XML data.

5. The method of claim 4, further comprising, returning results of the other query as objects corresponding to the relational data and the XML data.

6. The method of claim 1, wherein the condition further provides conditional mappings in which a same XML type is mapped to one of a plurality of different classes depending on at least one condition that applies to XML data that instantiates that type.

7. The method of claim 1, wherein the condition further provides conditional mappings in which a class is mapped to one of a plurality of different XML types depending on at least one condition that applies to data of the class.

8. The method of claim 1, wherein using the mapping further comprises decoupling query and update translation performed at runtime from schema translation used at compile time.

9. The method of claim 1, wherein providing the mapping further comprises, compiling declarative object-XML mappings into transformations that produce objects from XML data and transformations that produce XML data from objects.

10. The method of claim 1, wherein using the mapping further comprises translating LINQ queries into a mix of SQL and XQuery.

11. The method of claim 1, wherein providing the mapping comprises translating a combined database catalog into a set of object classes.

12. In a computing environment comprising at least one processor, a system comprising:
a database including a table that includes a plurality of data comprising relational data and XML data that is structured as a string of data; and
a translation layer coupled to the database, the database receiving data access requests from programming code, the translation layer comprising a mapping capable of mapping scalar type properties, complex type properties, and collection type properties, wherein the mapping comprises a condition element that includes a name attribute comprising a name and a value attribute comprising a value, wherein upon satisfaction of the condition defined by the name and the value, the mapping is used to present the plurality of data as object classes, wherein a first set of one or more object classes are mapped to at least the relational data and a second set of one or more object classes are mapped to at least the XML data for accessing the plurality of data via a data access request programmed against the object classes using a single language integrated query feature for programming the data access request, and the translation layer comprising a translating, wherein the translating comprises translating the data access request into at least a first query language for providing access to the relational data and a second query language for providing access to the XML data.

13. The system of claim 12, wherein the object class is loaded into working memory as a structure that corresponds to the object class.

14. The system of claim 12, wherein the XML data remains in the database in the XML data's native representation and is exposed as an object class via the translation layer.

15. The system of claim 12, wherein the mapping supports at least one of a strongly-typed class and a loosely-typed class.

16. The system of claim 13, wherein the translation layer uses the mapping to decouple query and update translations performed at runtime from schema translations used at compile time.

17. The system of claim 13, wherein at least part of the mapping includes transformations that produce objects from XML data or transformations that produce XML data from objects, or include both transformations that produce objects from XML data and transformations that produce XML data from objects.

18. In a computing environment, a method comprising:
receiving a database query, programmed using a single language integrated query feature, directed towards a database table;
determining that the database query requests access to data in a first column corresponding to relational data and data in a second column corresponding to XML data; and
separating the query into a first part that accesses the relational data and a second part that accesses the XML data, including accessing a set of conditional mappings capable of mapping scalar type properties, complex type properties, and collection type properties, the conditional mappings defined by at least one condition element comprising a name attribute and at least one value attribute, wherein the query is based on object classes, wherein a first set of one or more object classes are mapped to at least the relational data and a second set of one or more object classes are mapped to at least the XML data to provide access to the relational data and the XML data independent of whether the database table has relational data or XML data.

19. The method claim 18, further comprising instantiating an object based on the structure of the XML data.

20. The method of claim 1, wherein the condition comprises one of:
a condition on a value of a CLR type member;
a condition on the existence of an XML type member; and
a condition of the value of a scalar XML type.

* * * * *